United States Patent
Shepherd et al.

(10) Patent No.: US 9,948,574 B2
(45) Date of Patent: *Apr. 17, 2018

(54) BIT INDEXED EXPLICIT REPLICATION PACKET ENCAPSULATION

(71) Applicant: Cisco Technology, Inc., San Jose, CA (US)

(72) Inventors: Gregory J. Shepherd, Eugene, OR (US); Ijsbrand Wijnands, Leuven (BE); Christian Martin, Rumson, NJ (US)

(73) Assignee: Cisco Technology, Inc., San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/253,025

(22) Filed: Aug. 31, 2016

(65) Prior Publication Data
US 2017/0099232 A1 Apr. 6, 2017

Related U.S. Application Data

(63) Continuation of application No. 14/604,092, filed on Jan. 23, 2015, now Pat. No. 9,438,432, and a
(Continued)

(51) Int. Cl.
*H04L 12/801* (2013.01)
*H04L 12/927* (2013.01)
(Continued)

(52) U.S. Cl.
CPC ............ *H04L 47/806* (2013.01); *H04L 45/54* (2013.01); *H04L 45/50* (2013.01); *H04L 2212/00* (2013.01)

(58) Field of Classification Search
None
See application file for complete search history.

(56) References Cited

U.S. PATENT DOCUMENTS

| 5,764,624 A | 6/1998 | Endo | 370/218 |
| 5,999,531 A | 12/1999 | Ferolito | 370/390 |

(Continued)

FOREIGN PATENT DOCUMENTS

| CN | 101572667 | 11/2009 | H04L 12/56 |
| CN | 102025538 | 4/2011 | H04L 12/56 |
| WO | WO 2007/095331 | 8/2007 | 370/390 |

OTHER PUBLICATIONS

Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).
(Continued)

*Primary Examiner* — Chirag Shah
*Assistant Examiner* — Amar Persaud
(74) *Attorney, Agent, or Firm* — Campbell Stephenson LLP

(57) ABSTRACT

Methods and network devices are disclosed for multicast forwarding. In one embodiment, a method includes receiving at a node a multicast message comprising a message header, where the message header comprises an incoming message bit array and a set identifier value associated with the incoming message bit array. The method further comprises selecting a first forwarding table entry, the first forwarding table entry comprises a set identifier value matching that of the message header. The method further comprises comparing at least a portion of the incoming message bit array to a corresponding portion of a neighbor bit array of the first forwarding table entry, determining that for at least one relative bit position a corresponding destination node is both a destination for the message and a reachable destination from a first neighboring node, and forwarding a copy of the message to the first neighboring node.

19 Claims, 15 Drawing Sheets

Related U.S. Application Data continuation-in-part of application No. 14/488,790, filed on Sep. 17, 2014, and a continuation-in-part of application No. 14/488,761, filed on Sep. 17, 2014, and a continuation-in-part of application No. 14/488,810, filed on Sep. 17, 2014.

(60) Provisional application No. 61/931,473, filed on Jan. 24, 2014, provisional application No. 61/878,693, filed on Sep. 17, 2013.

(51) Int. Cl.
*H04L 12/741* (2013.01)
*H04L 12/723* (2013.01)

(56) References Cited

U.S. PATENT DOCUMENTS

| | | | |
|---|---|---|---|
| 6,148,000 A | 11/2000 | Feldman | 370/394 |
| 6,240,188 B1 | 5/2001 | Dondeti | 380/259 |
| 6,615,336 B1 | 9/2003 | Chen | 370/351 |
| 6,771,673 B1 | 8/2004 | Baum | 370/535 |
| 7,111,101 B1 | 9/2006 | Bourke | 326/40 |
| 7,519,733 B1 | 4/2009 | Thubert | 709/232 |
| 7,551,599 B2 | 6/2009 | Levit | 370/254 |
| 7,925,778 B1 | 4/2011 | Wijnands | 370/389 |
| 8,320,374 B2 | 11/2012 | de Heer | 370/390 |
| 8,325,726 B2 | 12/2012 | Baban et al. | 370/390 |
| 8,774,179 B1 | 7/2014 | Gaggara | 370/389 |
| 8,787,400 B1 | 7/2014 | Barth | 370/419 |
| 8,830,826 B2* | 9/2014 | Chen | H04L 45/22 370/228 |
| 8,848,728 B1 | 9/2014 | Revah | 370/389 |
| 8,942,256 B1 | 1/2015 | Barth | 370/255 |
| 9,065,766 B2 | 6/2015 | Matsuoka | |
| 2002/0126661 A1* | 9/2002 | Ngai | H04L 12/42 370/380 |
| 2002/0191628 A1 | 12/2002 | Liu | 370/428 |
| 2003/0043802 A1 | 3/2003 | Yazaki | 370/389 |
| 2003/0142685 A1 | 7/2003 | Bare | 370/410 |
| 2003/0210695 A1 | 11/2003 | Henrion | 370/392 |
| 2004/0264374 A1 | 12/2004 | Yu | 370/230 |
| 2005/0169270 A1 | 8/2005 | Mutou | 370/390 |
| 2006/0182035 A1 | 8/2006 | Vasseur | 370/238 |
| 2006/0280192 A1 | 12/2006 | Desanti | 370/409 |
| 2007/0127474 A1 | 6/2007 | Mirtorabi | 370/390 |
| 2007/0189291 A1 | 8/2007 | Tian | 370/390 |
| 2008/0159285 A1 | 7/2008 | De Heer | 370/390 |
| 2008/0165783 A1 | 7/2008 | Desanti | 370/392 |
| 2009/0067348 A1 | 3/2009 | Vasseur | 370/256 |
| 2009/0213735 A1* | 8/2009 | Check | H04L 47/10 370/236 |
| 2009/0219817 A1 | 9/2009 | Carley | 370/235.1 |
| 2009/0310610 A1 | 12/2009 | Sandstrom | 370/394 |
| 2010/0046515 A1 | 2/2010 | Wong | 370/390 |
| 2011/0202761 A1 | 8/2011 | Sarela | 716/163 |
| 2011/0228770 A1 | 9/2011 | Dholakia | 370/390 |
| 2011/0274112 A1 | 11/2011 | Czaszar | 370/392 |
| 2011/0299531 A1* | 12/2011 | Yu | H04L 12/4625 370/392 |
| 2012/0099591 A1 | 4/2012 | Kotha | 370/392 |
| 2012/0243539 A1 | 9/2012 | Keesara | 370/392 |
| 2013/0034097 A1 | 2/2013 | Dharmapurikar | 370/390 |
| 2013/0114595 A1 | 5/2013 | Mack-Crane | 370/390 |
| 2013/0114619 A1 | 5/2013 | Wakumoto | 370/406 |
| 2013/0136117 A1 | 5/2013 | Schrum, Jr. | 370/338 |
| 2013/0201988 A1 | 8/2013 | Zhou | 370/390 |
| 2013/0308948 A1* | 11/2013 | Swinkels | H04B 10/27 398/66 |
| 2013/0336315 A1 | 12/2013 | Guichard | 370/389 |
| 2013/0343384 A1* | 12/2013 | Shepherd | H04L 12/18 370/390 |
| 2014/0010223 A1 | 1/2014 | Wang | 370/338 |
| 2014/0043964 A1 | 2/2014 | Gabriel | 370/229 |
| 2014/0098813 A1 | 4/2014 | Mishra | 370/390 |
| 2014/0119191 A1 | 5/2014 | Onoue | 370/236 |
| 2014/0160925 A1 | 6/2014 | Xu | 370/235 |
| 2014/0189174 A1* | 7/2014 | Ajanovic | G06F 13/124 710/106 |
| 2015/0003458 A1 | 1/2015 | Li | 370/392 |
| 2015/0009823 A1* | 1/2015 | Ganga | H04L 47/2441 370/235 |
| 2015/0023328 A1 | 1/2015 | Thubert et al. | 370/336 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0081941 A1* | 3/2015 | Brown | G06F 13/362 710/116 |
| 2015/0085635 A1 | 3/2015 | Wijnands et al. | 370/216 |
| 2015/0092546 A1* | 4/2015 | Baratam | H04L 47/39 370/230 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0181309 A1 | 6/2015 | Wijnandd et al. | 725/109 |
| 2015/0334006 A1 | 11/2015 | Shao | 370/225 |
| 2016/0142248 A1 | 5/2016 | Thubert et al. | 370/372 |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |

OTHER PUBLICATIONS

Wijnands, Ijsbrand et al., "Area Specific Broadcasting Using Bit Indexed Explicit Replication"; U.S. Appl. No. 15/347,443, filed on Nov. 9, 2016; consisting of Specification, Claims, Abstract, and Drawings (65 pages).

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.;"Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

(56) References Cited

OTHER PUBLICATIONS

Hinden, R., Nokia and S. Deering, Cisco Systems, Inc.;"IP Version 6 Addressing Architecture," Network Working Group, Request for Comments 4291, Feb. 2006, pp. 1-25.
Kompella, K. et al., "The Use of Entropy Labels in MPLS Forwarding," Internet Engineering Task Force (IETF), Request for Comments 6790, Nov. 2012, pp. 1-25.
Kumar, N. et al., Cisco Systems, Inc., "OSPF Extension for Bit Index Explicit Replication, draft-kumar-ospf-bier-extension-00," Internet-Draft, May 19, 2014, pp. 1-7.
Kumar, N., et al., "BIER Use Cases, draft-kumar-bier-use-cases-00," Network Working Group, Internet-Draft, Oct. 25, 2014, pp. 1-7.
Laabs, Matthias, "SDI over IP—Seamless Signal Switching in SMPTE 2022-6 and a Novel Multicast Routing Concept," EBU Technical Review, 2012 Q4, pp. 1-7.
Przygienda, T. et al., "M-ISIS: Topology (MT) Routing in Intermediate System to Intermediate Systems (IS-ISs)," Network Working Group, Request for Comments 5120, Feb. 2008, pp. 1-14.
Psenak, P. et al., "Multi-Topology (MT) Routing in OSPF," Network Working Group, Request for Comments 4915, Jun. 2007, pp. 1-20.
Psenak, P. et al., Cisco Systems; "OSPF Extensions for BIER, draft-psenak-ospf-bier-extensions-00," OSPF, Internet-Draft, Sep. 27, 2014, pp. 1-6.
Psenak, P. et al., Cisco Systems; "OSPF Extensions for BIER, draft-psenak-ospf-bier-extensions-01," OSPF, Internet-Draft, Oct. 24, 2014, pp. 1-8.
Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.
Schulzrinne, H. et al.,; "RTP: A Transport Protocol for Real-Time Applications," Network Working Group, Request for Comments 3550, Jul. 2003, pp. 1-89.
SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Yongliang Li, et al., ABSTRACT Translation of CN-201010573400-A and CN 102025538, Database EPODOC [Online], European Patent Office, Apr. 20, 2011, pp. 1-2 [XP 002740355 on Extended EP SR].
Microsoft, "IPv6 Addressing (TechRef)"; Apr. 3, 2011; http://technet.microsoft.com/enus/library/dd392266(v=ws.10).aspx; pp.1-30.
Wang, Xiaorong et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (64 pages).
Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).
Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).

\* cited by examiner

| Bit Indexed Routing Table A 400 |||| Set:BP ||  |
|---|---|---|---|---|---|
| RID | VBP | MBAL | BAL 128 | BAL 256 | Nbr |
| D/32 | 1 | 256 | 0:1 | 0:1 | B |
| F/32 | 2 | 256 | 0:2 | 0:2 | B |
| C/32 | -- | 256 | -- | -- | B |
| E/32 | 257 | 512 | 2:1 | 1:1 | B |
| B/32 | -- | 512 | -- | -- | B |
| 402 | 404 | 406 | 408 || 410 |

FIG. 4A

| Bit Indexed Routing Table B 420 |||| Set:BP ||  |
|---|---|---|---|---|---|
| RID | VBP | MBAL | BAL 128 | BAL 256 | Nbr |
| D/32 | 1 | 256 | 0:1 | 0:1 | C |
| F/32 | 2 | 256 | 0:2 | 0:2 | C |
| C/32 | -- | 256 | -- | -- | C |
| E/32 | 257 | 512 | 2:1 | 1:1 | E |
| A/32 | 3 | 512 | 0:3 | 0:3 | A |
| 402 | 404 | 406 | 408 || 410 |

| Bit Indexed Forwarding Table A  540 |||||
|---|---|---|---|---|
| Bit Array Length: 256 |||||
| Set | BP | NBA | Nbr |
| 0 | 1 | 0...0 0011 | B |
| 0 | 2 | 0...0 0011 | B |
| 1 | 1 | 0...0 0001 | B |

| Bit-Indexed Forwarding Table A  550 ||||
|---|---|---|---|
| Bit Array Length: 128 ||||
| Set | BP | NBA | Nbr |
| 0 | 1 | 0...0 0011 | B |
| 0 | 2 | 0...0 0011 | B |
| 2 | 1 | 0...0 0001 | B |

| Bit-Indexed Forwarding Table B  560 ||||
|---|---|---|---|
| Bit Array Length: 256 ||||
| Set | BP | NBA | Nbr |
| 0 | 1 | 0...0 0011 | C |
| 0 | 2 | 0...0 0011 | C |
| 0 | 3 | 0...0 0100 | A |
| 1 | 1 | 0...0 0001 | E |

| Bit-Indexed Forwarding Table B  570 ||||
|---|---|---|---|
| Bit Array Length: 128 ||||
| Set | BP | NBA | Nbr |
| 0 | 1 | 0...0 0011 | C |
| 0 | 2 | 0...0 0011 | C |
| 0 | 3 | 0...0 0100 | A |
| 2 | 1 | 0...0 0001 | E |

542, 544, 546, 548

| Bit-Indexed Routing Table B | | | | | | 700 | |
|---|---|---|---|---|---|---|---|
| RID | VBP | MBAL | Top. ID | Set:BP | | Nbr | |
| | | | | BAL 256 | BAL 512 | Top. ID 50 | Top. ID 60 |
| A/32 | 3 | 512 | 50, 60 | 0:3 | 0:3 | A | A |
| E/32 | 257 | 512 | 60 | 1:1 | 0:257 | -- | E |
| C/32 | -- | 256 | 50 | -- | -- | C | -- |
| F/32 | 2 | 256 | 50 | 0:2 | -- | C | -- |
| D/32 | 1 | 256 | 50 | 0:1 | -- | C | -- |
| G/32 | -- | 512 | 60 | -- | -- | -- | G |
| H/32 | -- | 512 | 60 | -- | -- | -- | G |
| I/32 | 258 | 512 | 50, 60 | 1:2 | 0:258 | C | G |

| Bit-Indexed Routing Table C | | | | | 720 |
|---|---|---|---|---|---|
| RID | VBP | MBAL | Top. ID | Set:BP | Nbr |
| | | | | BAL 256 | Top. ID 50 |
| A/32 | 3 | 512 | 50, 60 | 0:3 | B |
| B/32 | -- | 512 | 50, 60 | -- | B |
| F/32 | 2 | 256 | 50 | 0:2 | F |
| D/32 | 1 | 256 | 50 | 0:1 | D |
| I/32 | 258 | 512 | 50, 60 | 1:2 | D |

| Bit-Indexed Forwarding Table B | | | | | 800 |
|---|---|---|---|---|---|
| Top. ID | BAL | Set | BP | NBA | Nbr |
| 50 | 256 | 0 | 1 | 0...0 0011 | C |
| | | | 2 | 0...0 0011 | C |
| | | | 3 | 0...0 0100 | A |
| | | 1 | 2 | 0...0 0010 | C |
| | | | 3 | 0...0 0100 | A |
| 60 | 512 | 0 | 257 | 0...0 0001 0...0 | E |
| | | | 258 | 0...0 0010 0...0 | G |
| | 802 | 804 | 806 | 808 | 810 | 812 |

814 points to the rows for Top. ID 50.
816 points to the rows for Top. ID 60.

*FIG. 8A*

| Bit-Indexed Forwarding Table C | | | | | 820 |
|---|---|---|---|---|---|
| Top. ID | BAL | Set | BP | NBA | Nbr |
| 50 | 256 | 0 | 1 | 0...0 0001 | D |
| | | | 2 | 0...0 0010 | F |
| | | | 3 | 0...0 0100 | B |
| | | 1 | 2 | 0...0 0010 | D |
| 802 | 804 | 806 | 808 | 810 | 812 |

*FIG. 8B*

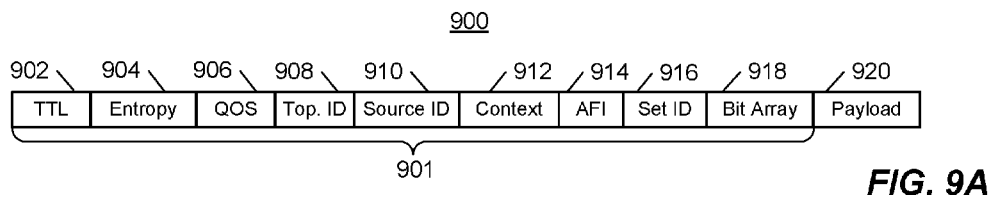
*FIG. 9A*
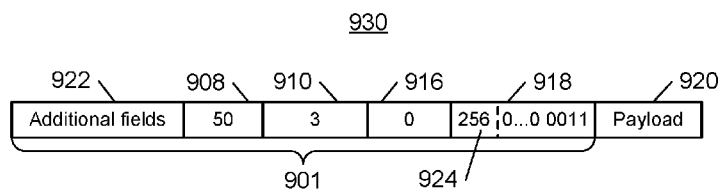
*FIG. 9B*
*FIG. 9C*
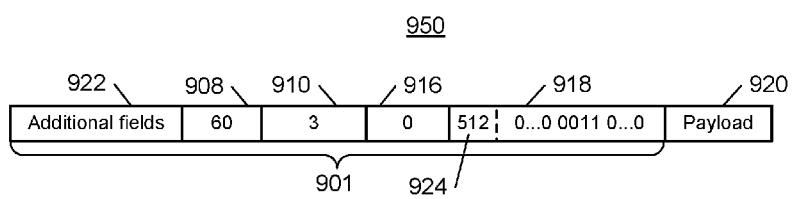
*FIG. 9D*
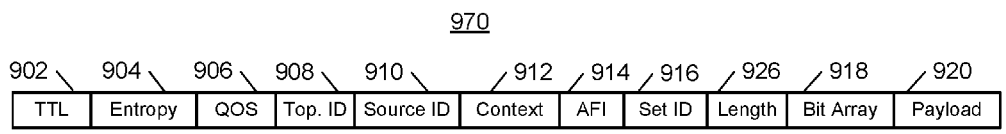
| Top. ID | BAL | Set ID range |
|---|---|---|
| 50 | 256 | 0-4 |
|  | 512 | 5-9 |
| 60 | 256 | 10-14 |
|  | 512 | 15-19 |
*FIG. 9E*
| Bit-Indexed Forwarding Table B 990 ||||
|---|---|---|---|
| Set | BP | NBA | Nbr |
| 0 | 1 | 0...0 0011 | C |
|  | 2 | 0...0 0011 | C |
|  | 3 | 0...0 0100 | A |
| 1 | 2 | 0...0 0010 | C |
|  | 3 | 0...0 0100 | A |
| 15 | 257 | 0...0 0001 0...0 | E |
|  | 258 | 0...0 0010 0...0 | G |
*FIG. 9F*

BIT INDEXED EXPLICIT REPLICATION PACKET ENCAPSULATION

RELATED APPLICATIONS

The present application is a continuation of U.S. application Ser. No. 14/604,092, filed on Jan. 23, 2015 and entitled "Bit Indexed Explicit Replication Packet Encapsulation, now U.S. Pat. No. 9,438,432 issued on Sep. 6, 2016, which application claims the benefit under Title 35 of the United States Code § 119(e) of U.S. Provisional Application No. 61/931,473, entitled "Bit Mask Forwarding Architectures for Stateless Multipoint Replication," filed Jan. 24, 2014.

Parent application Ser. No. 14/604,092 is a continuation-in-part of U.S. application Ser. No. 14/488,790, entitled "Bit Indexed Explicit Replication Using Multiprotocol Label Switching," filed Sep. 17, 2014, which in turn claims the benefit under Title 35 of the United States Code § 119(e) of U.S. Provisional Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Parent application Ser. No. 14/604,092 is also a continuation-in-part of U.S. application Ser. No. 14/488,761, entitled "Bit Indexed Explicit Replication," filed Sep. 17, 2014, which in turn claims the benefit under Title 35 of the United States Code § 119(e) of U.S. Provisional Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Parent application Ser. No. 14/604,092 is also a continuation-in-part of U.S. application Ser. No. 14/488,810, entitled "Bit Indexed Explicit Replication Using Internet Protocol Version 6," filed Sep. 17, 2014, which in turn claims the benefit under Title 35 of the United States Code § 119(e) of U.S. Provisional Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Each of the above-referenced applications, including application Ser. Nos. 14/604,092; 14/488,790; 14/488,761; 14/488,810; 61/878,693 and 61/931,473, is hereby incorporated by reference in its entirety and for all purposes as if completely and fully set forth herein.

BACKGROUND

Network nodes forward data. Network nodes may be implemented as one or more routers, one or more bridges, one or more switches, one or more servers, or any other suitable communications processing device. Data in a network is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Forwarding messages involves various processes that, while simple in concept, can be complex. The processes involved in forwarding vary, depending on the type of forwarding method used. Overall forwarding configurations include unicast, broadcast, and multicast forwarding. Unicast is a method of point-to-point communication most often used when a particular node (known as a source) wishes to send data to another particular node (known as a receiver) rather than sending the data to multiple receivers. Broadcast is a method used when a source wishes to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features, and advantages made apparent to those skilled in the art by referencing the accompanying drawings.

FIGS. 4A-4B are exemplary routing tables generated by nodes of the network of FIG. 3A.

FIGS. 5A-5D are exemplary forwarding tables generated by nodes of the network of FIG. 3A.

FIGS. 7A-7B are exemplary routing tables generated by nodes of the network of FIG. 6.

FIGS. 8A-8B are exemplary forwarding tables generated by nodes of the network of FIG. 6.

FIGS. 9A-9D illustrate exemplary header formats for a packet traveling through the network of FIG. 6.

FIG. 9E illustrates an exemplary mapping of set identifier ranges to other network attributes.

FIG. 9F is an exemplary forwarding table generated by a node of the network of FIG. 6.

DETAILED DESCRIPTION OF EXEMPLARY EMBODIMENTS

Overview

A method and network device are disclosed for multicast forwarding through bit indexed explicit replication (BIER). In one embodiment, the method includes receiving at a node in a network a multicast message comprising a message header and a message payload. In this embodiment, the message header comprises an incoming message bit array and a size value representing a length of the incoming message bit array, and the node comprises a bit-indexed forwarding table comprising one or more forwarding table entries. Each of the one or more forwarding table entries comprises in this embodiment a respective neighbor bit array and is associated with a respective neighboring node, and a set of multiple possible destination nodes for the message corresponds to the same set of respective relative bit positions in the incoming message bit array and each of the neighbor bit arrays. In this embodiment, the method further includes comparing at least a portion of the incoming message bit array to a corresponding portion of a first neighbor bit array of a first forwarding table entry of the one or more forwarding table entries, and determining that for at least one relative bit position the corresponding destination node is both an intended destination for the message and a reachable destination from a first neighboring node associated with the first forwarding table entry. The method further includes, in response to the determining, forwarding to the first neighboring node a copy of the message comprising a forwarded message bit array in place of the incoming message bit array.

Multicast

Multicast transmission delivers multicast data packets (data packets that traditionally include information identifying a multicast group, such as a multicast group address) from a source to multiple receivers without unduly burdening the source. Although much of the discussion in this disclosure is in terms of packets, it should be understood that the disclosures made herein may also be applicable to other types of network messages, such as datagrams or data frames. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Figure 1A:
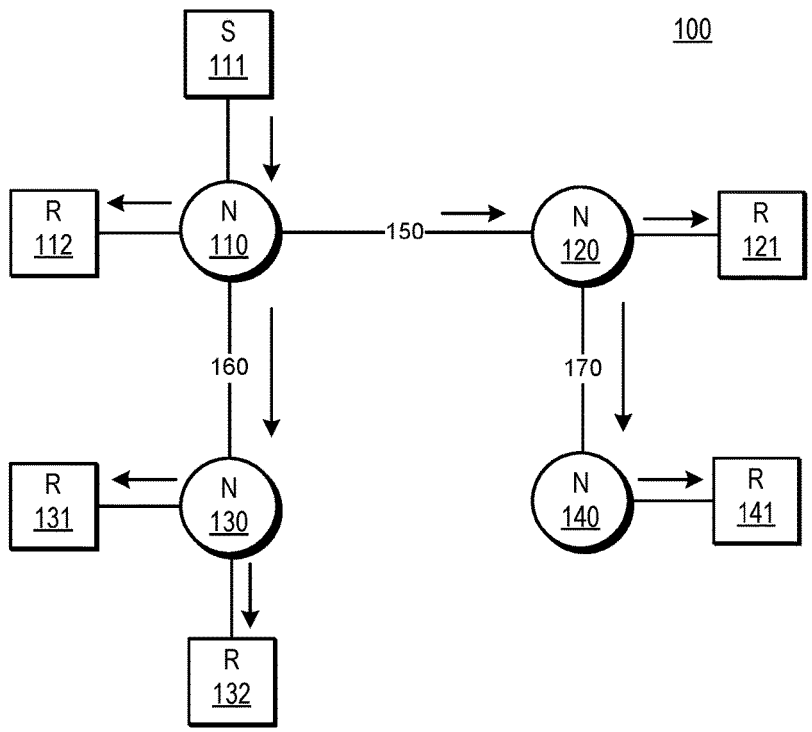
FIG. 1A is a simplified diagram illustrating certain components of an example network.

FIG. 1A is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected via a path in the form of a multicast distribution tree (MDT) to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using join messages such as, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110, and then nodes 130 and 120, as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

Figure 1B:
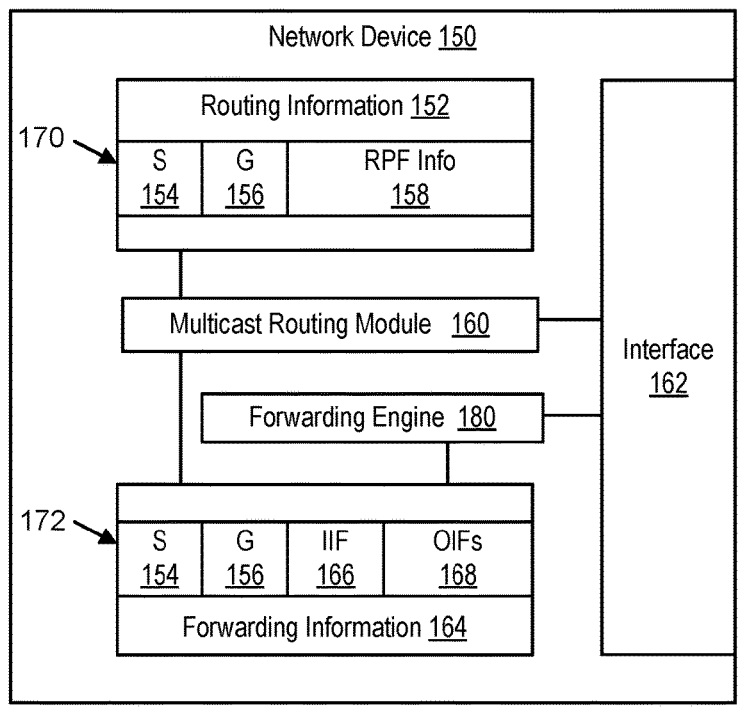
FIG. 1B is a simplified block diagram illustrating certain components of an exemplary network device that may be associated with a node of the network of FIG. 1A.

A block diagram of an exemplary network device that may be associated with a node in network 100 of FIG. 1A is shown in FIG. 1B. Network device 150 of FIG. 1B may, for example, be associated with multicast-enabled node 120 in FIG. 1A. In some cases "node" as used herein encompasses a network device associated with the node. "Network devices" as used herein includes various devices, such as routers, switches, or network controllers, that perform routing functions and support a routing protocol. A network device maintains one or more routing tables that stores routing information identifying routes to various data sources and/or data consumers. In a multicast-enabled node, a network device implements a multicast routing protocol that is used to convey multicast data packets from a multicast source such as source 111 of FIG. 1A to a multicast receiver. For each multicast group to which a multicast source sends data, the multicast routing protocol can establish a multicast distribution tree, which is a group of coupled nodes that can convey packets from the multicast source to the multicast receivers.

In the embodiment of FIG. 1B, network device 150 includes storage for multicast routing information 152, storage for multicast forwarding information 164, a routing module 160, and an interface 162. Interface 162 is coupled to send and receive packets. It is noted that network device 150 may include additional interfaces, and that each interface can be a logical or physical interface.

Routing module 160 is configured to perform multicast routing based on the stored multicast routing information 152. Routing module 160 is also configured to update the stored multicast forwarding information 164. A forwarding engine 180 can forward multicast data packets using the stored multicast forwarding information 164. Routing module 160 can implement one or more instances of a unicast routing protocol and one or more instances of a multicast routing protocol.

Entry 170 provides an example of the routing information that can be stored for a particular multicast group. As shown, entry 170 includes a source address (S) 154, a group address (G) 156, and reverse path forwarding (RPF) identifying information ("RPF info") 158. The RPF identifying information identifies which interface within a network device associated with node 110 properly receives multicast data packets addressed to group G, as well as the RPF neighbor that is properly forwarded those multicast data packets. The RPF interface is the interface leading to the root of the multicast tree for group G (e.g., the root of the multicast tree can be the rendezvous point associated with group G). The storage for multicast routing information 152 is, in one embodiment, implemented as a Multicast Routing Information Base (MRIB).

Entry 172 provides an example of the forwarding information that can be stored for a particular multicast group. As shown, entry 172 includes a source address (S) 154, a group address (G) 156, an incoming interface (IIF) list 166, and an outgoing interface (OIF) list 168. A forwarding engine uses the information in entry 172 to forward multicast data packets addressed to multicast group G. For example, when a packet having destination address G is received, the forwarding engine accesses entry 172 and verifies the source address and incoming interface of the packet. If the packet was received via an interface other than the one identified in IIF 166, the packet is dropped. If the packet matches the information in entry 172, the packet is forwarded from the interfaces listed in OIF 168. The storage for multicast forwarding information 164 is, in one embodiment, implemented as a Multicast Forwarding Information Base (MFIB).

The above-described process traditionally used in setting up MDTs and updating multicast forwarding tables for each multicast group results in considerable amounts of state information within the network. The multicast forwarding tables maintained by each multicast-enabled node, in particular, can become quite large in networks with many sources, many groups, or both. Maintaining such multicast forwarding tables represents limitations on network scalability.

Bit Indexed Explicit Replication

As described herein, the amount of state information within a multicast network may be reduced by methods, devices and systems in which receiver information is carried by the packet rather than being looked up in tables at each network node based on source and group information. In an embodiment, a group of receivers is represented by an array of bits carried in a packet, and the packet is forwarded based on this receiver information. This greatly reduces the amount of state information stored at nodes and is therefore also referred to as "stateless multicast." More formally, the term Bit Indexed Explicit Replication (BIER) is used to describe this approach. As suggested by the term, a bit position is used as an index into a forwarding table and packets are replicated only to specified nodes.

Figure 2A:
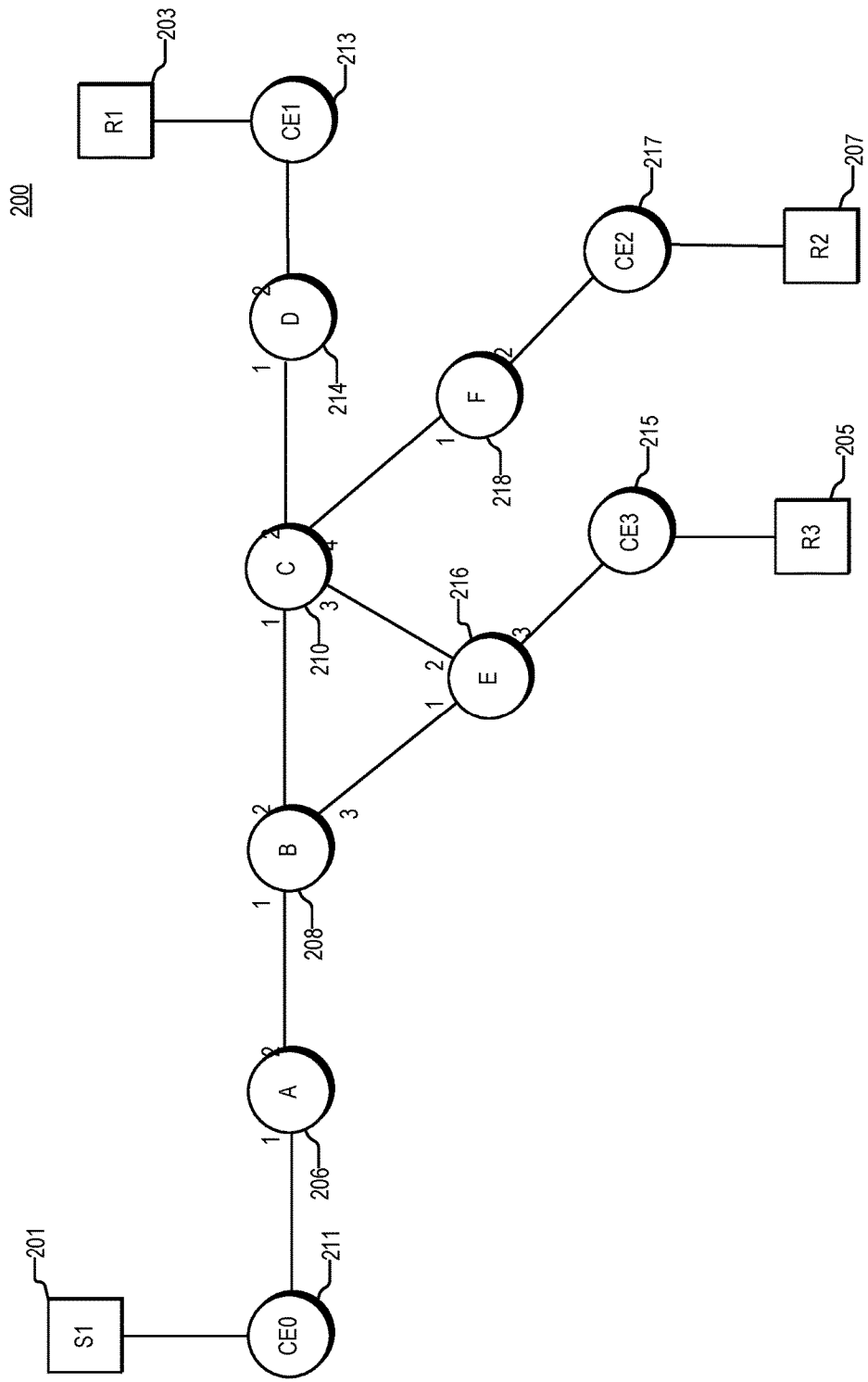
FIG. 2A is a simplified diagram illustrating certain components of an example network.

FIG. 2A shows an example network 200. Network 200 includes BIER-enabled nodes 206, 208, 210, 214, 216 and 218. BIER-enabled nodes are configured to forward packets using BIER. For example, BIER-enabled nodes are configured to store and use bit-indexed forwarding tables, as explained further below. A BIER-enabled node may also be referred to as a "bit-forwarding router" (BFR) herein. The BIER-enabled nodes in FIG. 2A form a provider network, or domain. Such a provider network could be employed by an Internet service provider to transport packets to customers. The domain includes core nodes 208 and 210, and provider edge nodes 206, 214, 216, and 218. The provider edge nodes are coupled to customer edge nodes 211, 213, 215, and 217. Hosts 201, 203, 205, and 207 are coupled to the customer edge nodes. In the embodiment of FIG. 2, host 201 is a multicast source, while hosts 203, 205 and 207 are configured as multicast receivers, or subscribers.

Each of the BIER-enabled nodes 206, 208, 210, 214, 216 and 218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, prefix, or loopback address. The RID may also be referred to as a "BFR-Prefix" herein. Network 200 and the other BIER-enabled networks described herein are not limited to any particular version of IP or to any particular routing protocol at all. Each BIER-enabled node advertises or floods the routable address to all other BIER-enabled nodes in network 200. Each BIER-enabled node builds a unicast topology of the BIER-enabled nodes in network 200 using the advertised routable addresses.

BIER-enabled node 206 is configured as an ingress router for multicast data packets. A BIER-enabled ingress router may also be referred to as a "bit-forwarding ingress router" (BFIR) herein. The ingress router is coupled, via customer edge node 211, to source 201. Multicast data packets from source 201 enter the BIER network via the ingress router (BIER-enabled node 206). Each of BIER-enabled nodes 214, 216, and 218 is configured as an egress router. The egress routers can be connected (directly or via customer edge routers) to hosts, such as receivers, or other networks. An egress router is a BIER-enabled node that is the last BIER-enabled node on a path between a source and a receiver. As such, an egress router is a destination node when forwarding using BIER. The egress router may be a provider edge node that is coupled to the receiver either directly or indirectly (e.g., through a non-BIER-enabled customer edge node). A BIER-enabled egress router may also be referred to as a "bit-forwarding egress router" (BFER) herein.

In an embodiment, receiver information is included in the packet by assigning each edge router in a BIER network a bit position (BP) within a packet bit array carried by the packet (or, more generally, a message bit array carried by a network message). An edge router assigned a bit position in this manner is also associated with the same relative bit position in a neighbor bit array stored in a bit-indexed forwarding table at a BIER-enabled node. Either or both of the packet bit array and neighbor bit array may also be referred to as a bit mask (BM) herein. In some embodiments, the packet bit array is referred to as a bit string or BitString and the neighbor bit array is referred to as a bit mask. As used herein, the term bit array, bit string or bit mask refers to a set of bits that has a fixed or variable length.

The length of the bit arrays used in a particular BIER network—i.e., the number of bits in the array—can be statically configured or dynamically assigned and distributed through the BIER network. The bit array can have any suitable length. In an embodiment, the length is determined in view of the size and capabilities of the network. In one embodiment, the length of the bit array is between 8 and 4096 bits. In a further embodiment, the length of the bit array is between 256 and 1024 bits. The maximum bit array length value is determined, in one embodiment, by hardware or software limitations of the BIER-enabled nodes in the BIER network. In one embodiment, different BIER-enabled nodes in the BIER network have different maximum bit array lengths. For example, one BIER-enabled node may have a maximum bit array length of 128 bits while another BIER-enabled node may have a maximum bit array length of 256 bits.

The number of egress routers or destination nodes that can be represented by a bit position in a packet bit array or neighbor bit array depends on the length of the array. In an embodiment, the number of egress routers represented by a bit array is increased by associating a set identifier with a bit array in a packet or forwarding table entry. The same bit position can then be used to represent one egress router in, for example, set 0 and a different egress router in set 1. In some embodiments, sets are used for network management purposes such as multi-topology routing, temporal slicing, or grouping of geographically-proximate nodes. In an embodiment, each edge router is assigned a "virtual bit position" represented by an integer unique among the edge routers in the autonomous system. An autonomous system, or routing domain, as used herein refers to a collection of interconnected network nodes under a common administration for purposes of network configuration. A routing domain formed from BIER-enabled routers may also be referred to as a "BIER domain" herein. A virtual bit position may also be referred to as a BFR-ID herein. Use of a virtual bit position for an edge router allows a set identifier and bit position to be assigned dynamically within the network depending on the bit array length in use.

A bit position (absolute or virtual) can be statically or dynamically assigned to an edge router. The bit position may be assigned by a central authority, such as a network controller (which may in an embodiment be a multicast data controller), or through another mechanism such as derivation of a BP from an identifier for the router. Each edge router should have at least one unique bit position within the bit array. In an embodiment, multiple BPs are assigned to a single edge router, to allow multicast delivery, for example, to multiple receivers connected to the edge router via separate interfaces of the router. The edge router (or interface) associated with a bit position may vary with time in some embodiments, for purposes such as failure response or optimization of network performance.

BIER Packet Forwarding Example

Figure 2B:
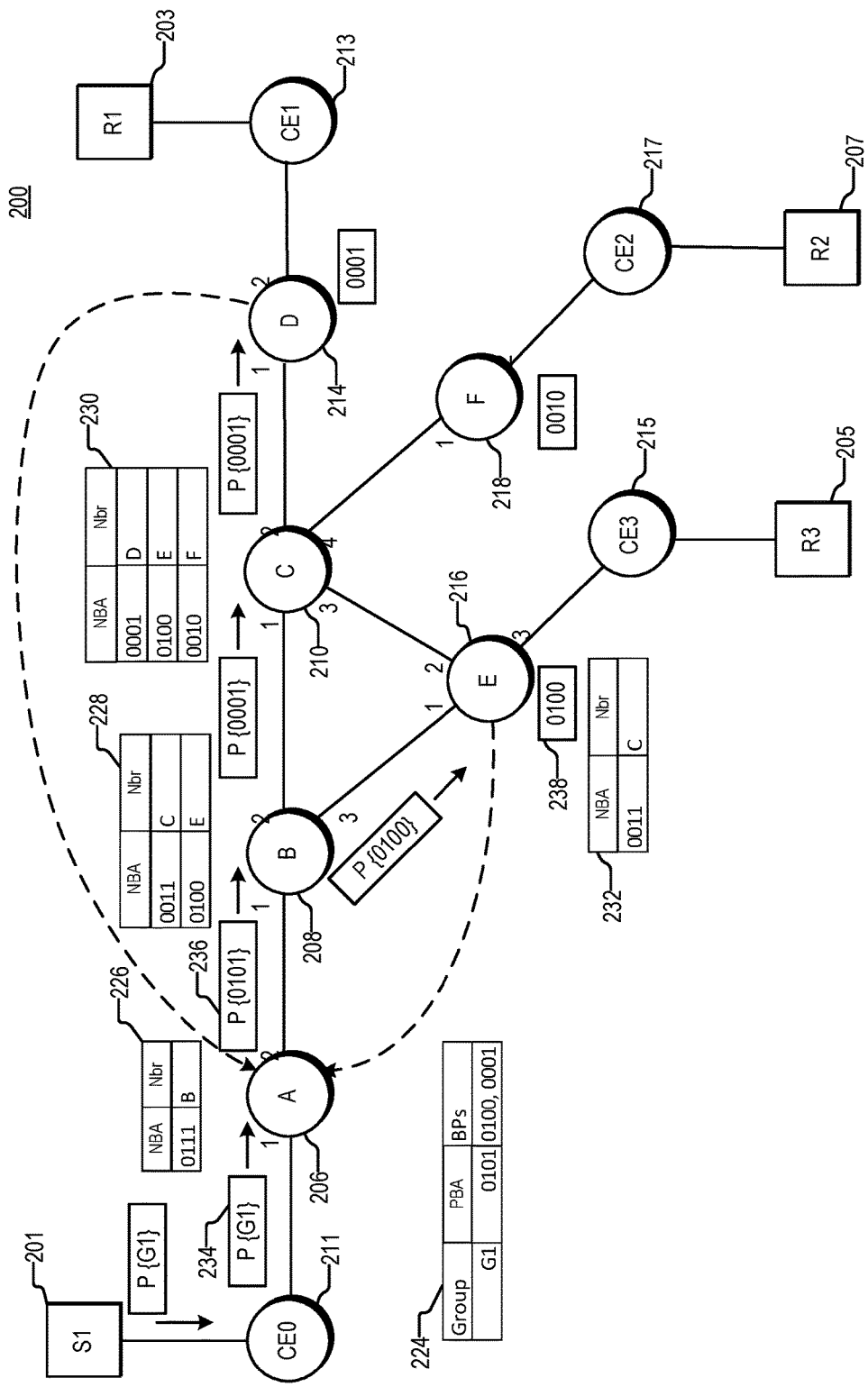
FIG. 2B is a simplified diagram illustrating certain aspects of an exemplary forwarding process using the network of FIG. 2A.

To illustrate the operation of BIER packet forwarding, network 200 of FIG. 2A is shown again with additional annotation in FIG. 2B. In the embodiment of FIG. 2B, BIER-enabled node 214 (an egress router) signals to BIER-enabled node 206 (an ingress router) that BIER-enabled node 214 is interested in receiving packets associated with a given multicast group or flow. BIER-enabled node 216 likewise signals BIER-enabled node 206 that BIER-enabled node 216 is interested in the same multicast group. The signaling is represented by the dashed lines shown in FIG. 2. BIER-enabled node 206 updates an entry in group membership table (GMT) 224 (or creates one if one does not already exist) for the multicast group and updates a packet bit array (PBA) in the entry by setting bits corresponding to BIER-enabled nodes 214 and 216. The bit position for node 216 is represented by bit string 238 having bit 3 of the four bits (counting from the least significant bit at the right) set to 1. Similarly, the bit position assigned to node 214 is represented by the bit string 0001 having bit 1 set. Assuming that only BIER-enabled nodes 214 and 216 are interested in the flow, the PBA includes set bits for each of these two bit positions, for an array of {0101}.

In the simplified example of FIG. 2B, the packet bit array and neighbor bit arrays used are four bits long, which is sufficient to represent the three egress routers in network 200, each connected to a respective one of the three receivers in the network. In this example, a "1" value in a bit position of a packet bit array indicates that the corresponding destination node is an intended destination for the packet. An alternative convention for the value at a bit position could be used in another embodiment, but in any case the value of the bit at a bit position in a packet bit array indicates whether the corresponding destination node is an intended destination.

BIER-enabled node (and ingress router) 206 is configured to receive a multicast data packet 234 addressed to the multicast group or flow G1 (e.g., from source 201 via customer edge node 211). In the embodiment of FIG. 2B, BIER-enabled node 206 uses the multicast group address and/or source address included in the multicast data packet to access its GMT and select a packet bit array associated with the multicast group. After selecting a PBA that corresponds to the multicast group from the GMT, BIER-enabled node 206 encapsulates the packet bit array into the multicast data packet, resulting in BIER packet 236. Ingress node 206 also identifies the neighbors to which packet 236 will be forwarded. In an embodiment, the neighbors are identified using the bit-indexed forwarding table (BIFT) of node 206, a portion 226 of which is shown in FIG. 2B. In a further embodiment, this involves performing an AND operation between the packet bit array and each neighbor bit array (NBA) in BIER-enabled node 206's BIFT. In this example, there is only one entry in the BIFT and the entry corresponds to BIER-enabled node 208. This means that the shortest path from BIER-enabled node 206 to all three of the egress routers in network 200 runs through BIER-enabled node 208. Since the result of the AND is TRUE for neighbor B (BIER-enabled node 208), BIER-enabled node 206 forwards the multicast data packet to BIER-enabled node 208. This forwarding may involve other information from the BIFT for node 206 not shown in portion 226, such as egress interface information. In the embodiment of FIG. 2B, BIER-enabled node 206 also modifies the packet bit array in the multicast data packet it forwards, as discussed further below.

In an embodiment, in response to receiving the multicast data packet, BIER-enabled node 208 performs an AND between the packet bit array in the multicast data packet, {0101}, and the neighbor bit array in each entry in its BIFT (a portion 228 of which is shown). The result for neighbor C is TRUE so BIER-enabled node 208 forwards the multicast data packet to BIER-enabled node 210. BIER-enabled node 208 also modifies the packet bit array in the multicast data packet it forwards, as discussed below. The result for neighbor E is also TRUE, so BIER-enabled node 208 replicates the multicast data packet and forwards the multicast data packet to BIER-enabled node 216, which is an egress router. In the example of FIG. 2B, a "1" value in a bit position of a neighbor bit array indicates that the destination node assigned to the bit position is reachable from the neighboring node corresponding to the forwarding table entry containing the neighbor bit array. An alternative convention for the value at a bit position could be used in another embodiment, but in any case the value of the bit at a bit position in a neighbor bit array indicates whether the corresponding destination node is a reachable destination from the neighbor associated with the neighbor bit array.

In an embodiment, BIER-enabled node 210, in response to receiving a copy of the multicast data packet, performs an AND between the packet bit array in the multicast data packet, {0001}, and the neighbor bit array in each entry in its BIFT (portion 230 of which is shown). The result for neighbor D is TRUE so BIER-enabled node 210 forwards the multicast data packet to BIER-enabled node 214 which is an egress router. The result for neighbor F is FALSE, so BIER-enabled node 210 refrains from forwarding the multicast data packet to BIER-enabled node 218. In this way the multicast data packet travels from the ingress router (BIER-enabled node 206) through the BIER network to the two egress routers that signaled an interest in the multicast group (BIER-enabled nodes 214 and 216).

In the embodiment of FIG. 2B, each time the BIER packet is forwarded using an entry in a bit-indexed forwarding table, the packet bit array in the forwarded packet is altered to clear any set bits in bit positions corresponding to nodes not reachable from the neighbor that the packet is being forwarded to. For example, when the multicast packet arrives at node B, it has an incoming packet bit array of {0101}. Comparison of the packet bit array to the neighbor bit arrays shown in BIFT portion 228 shows that the set first (rightmost) bit of the PBA corresponds to a destination node reachable through neighbor C, while the set third bit corresponds to a node reachable through neighbor E. The packet bit array in the packet forwarded to neighbor C accordingly has only the first bit set, and the PBA in the packet forwarded to neighbor E has only the third bit set. This modification of the packet bit array when a BIER packet is forwarded prevents looping and duplication by ensuring that a BIER-enabled node forwards a given multicast data packet only once based on a given bit position. This alteration of the packet bit array to clear bits that are not also set in the neighbor bit array can be interpreted as a form of masking by the neighbor bit array.

In an alternative embodiment, the above-described modification of the packet bit array can be done as the packet arrives at the next node rather than as it leaves the forwarding node. For example, a BIER-enabled node such as node 208 may provide one or more of its neighboring nodes with the neighbor bit array corresponding to that neighboring node in the appropriate entry of the BIER-enabled node's bit indexed forwarding table. In an embodiment, the neighbor bit array is provided to the neighboring node through advertisements such as interior gateway protocol (IGP) advertisements. A node receiving a forwarded BIER packet can then perform an AND operation with the packet bit array of the received node and the neighbor bit array advertised to the receiving node by the forwarding node. The result becomes the new packet bit array for the received packet, and is used for the BIER forwarding process carried out by the receiving node. This modification of the packet bit array of a BIER packet by the receiving node rather than the forwarding node may be referred to as remote ingress filtering.

In addition to alteration of the packet bit array sent with a forwarded packet (which may also be called a forwarded packet bit array herein), the packet bit array used at a BIER-enabled node for comparison to each neighbor bit array within a BIFT may be modified each time a packet is sent. Specifically, if a packet is sent as a result of comparing the incoming PBA to a neighbor bit array in a bit-indexed forwarding table at the node, the PBA used for comparison to the next neighbor bit array in the forwarding table is altered to remove the destinations of the just-sent packet as intended destinations. In one embodiment, this alteration includes performing a bitwise AND operation between the incoming PBA and the inverse of the neighbor bit array corresponding to the neighbor node to which a packet was just sent. This has the effect of clearing those bits corresponding to bit positions which were set in the forwarded PBA of the outgoing packet.

Returning to the operation of node B in FIG. 2B, in one embodiment the incoming PBA of {0101} is compared to NBA {0011} for neighbor C. Because bit position 1 is set in both of these arrays, a packet is sent to neighbor C with the PBA modified in the sent packet as described above. In addition, the incoming PBA may be altered so that position 1 is no longer set before moving down the table to compare to NBA {0100} for neighbor E. The PBA used to compare to the forwarding table entry for neighbor E is therefore {0100} in such an embodiment. Because position 1 is not set in the NBA for neighbor E anyway, alteration of the PBA before comparison does not have an effect in this case. This alteration can prevent sending of a duplicate packet, however, in a case for which multiple forwarding table entries have an NBA with the same bit set. This can happen, for example, in equal cost multi-path (ECMP) arrangements.

The above-described modifications to the packet bit array are not needed in embodiments in which the network has a loop-free topology. One example of a loop-free topology is a point-to-multipoint (P2MP) label switched path (LSP) in a network employing multiprotocol label switching (MPLS). Modifications to the packet bit array may also be omitted in embodiments in which some amount of looping and/or duplication can be tolerated.

Bit-Indexed Routing and Forwarding Tables

Each BIER-enabled node in the BIER network uses the BPs and router identifiers (RIDs) of the other BIER-enabled nodes to generate one or more bit-indexed routing tables (BIRTs) and bit-indexed forwarding tables (BIFTs). A bit-indexed routing table is a table that stores BP-to-router identifier mappings. In an embodiment, the BIER-enabled nodes learn about the BP-to-router ID mappings through advertisements sent by the BIER-enabled nodes having assigned bit positions.

In response to a BP being assigned to an egress router, the egress router advertises its BP along with its router identifier to some or all of the other nodes in the BIER network. In one embodiment, the ER advertises its BP via an interior gateway protocol (IGP). Within an autonomous system, an IGP is used for exchanging network topology information between nodes (all nodes, whether BIER-enabled or not). There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols. Messages called advertisements are used in IGPs to exchange information. Nodes in an IP network automatically exchange network topology information through IGP advertisements.

In an embodiment, ISIS and/or OSPF protocols can be modified to assist in distributing BP-to-router ID mappings through the BIER network using link state updates. In OSPF, such a link state update is called a link-state advertisement (LSA). Certain types of LSAs are "opaque" LSAs which are forwarded through the network even by nodes that do not themselves have the capability to use the information in the LSA. Such opaque LSAs may be useful in networks having both BIER-enabled and non-BIER enabled nodes. Other flooding mechanisms to distribute the information are possible. All BIER-enabled nodes in a BIER network, not just the egress routers, also flood their respective router identifiers, which are used in building network topology and unicast forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the usual topology information exchanged through IGP advertisements, and the state information maintained on a per-group basis in traditional multicast.

Using a mechanism such as IGP advertisements, each BIER-enabled node receives BP-to-router identifier mappings and stores them in a BIRT. In an embodiment using an MPLS implementation of BIER, the BIER-enabled node also includes at least one label range in the BIRT for each router ID. If multiple bit array sizes are in use, BIER-enabled nodes advertise multiple label ranges, for example, one label range for each bit array size.

Using the router identifiers, a BIER-enabled node performs a recursive lookup in unicast routing tables to identify a directly connected next hop BIER-enabled node (referred to herein as a neighbor (Nbr)) on the shortest path from the BIER-enabled node toward the BIER-enabled node associated with the BP, and the interface via which the neighbor is reachable. In one embodiment, the neighbor is the next hop on a shortest path (SPT) towards the egress router that originated the advertisement of the bit position. In one embodiment, the BIRT includes one entry per BP. In an MPLS implementation, each entry can include multiple label ranges associated with the router ID; for example, if the BIER-enabled node uses multiple bit array sizes, each bit array size has an associated label range.

Figures 3A, 3B:
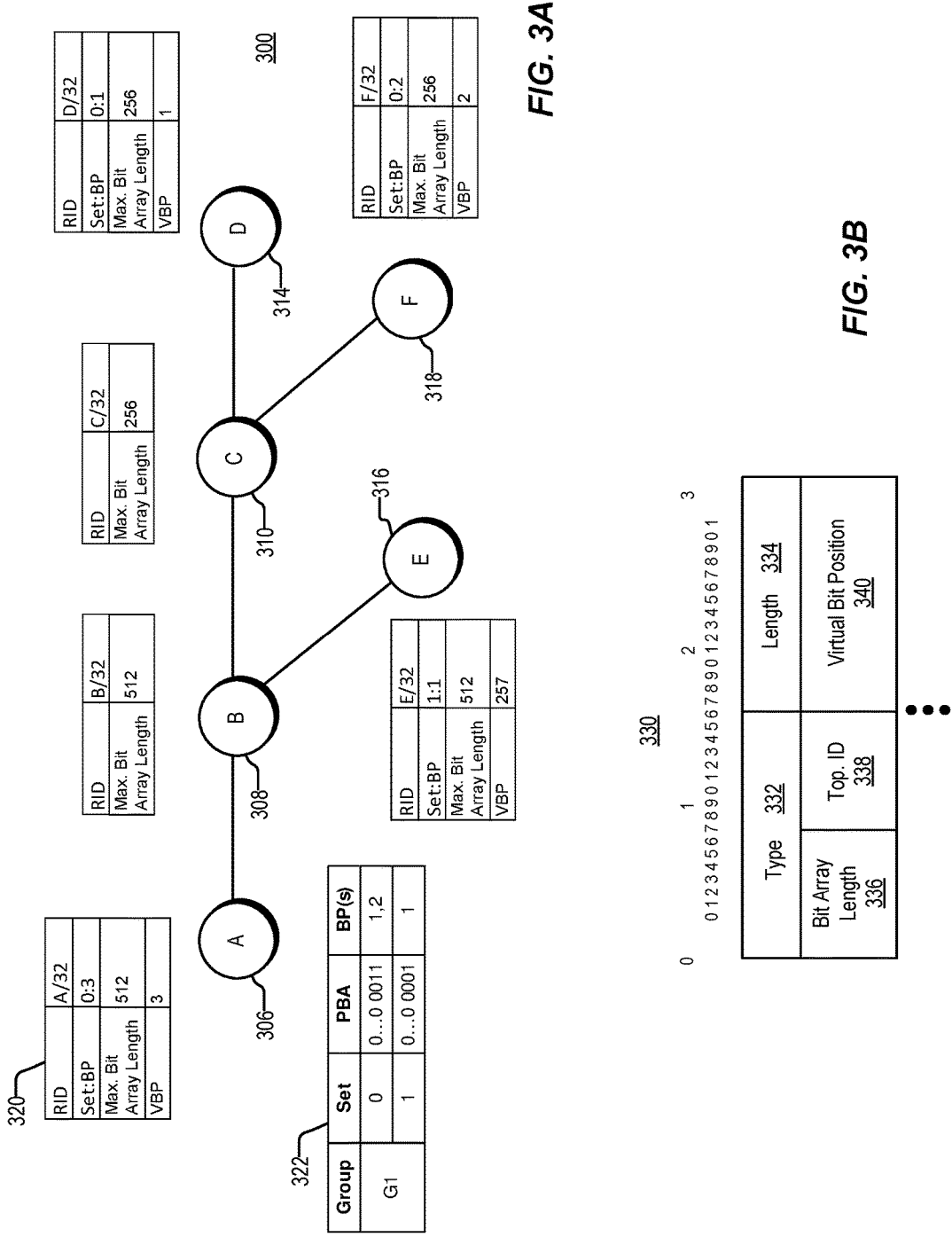
FIG. 3A is a simplified diagram illustrating certain components of an example network.
FIG. 3B illustrates an exemplary advertisement format used by a node of the network of FIG. 3A.

Example BIRTs and BIFTs are described in the context of FIG. 3A. FIG. 3A is similar to FIG. 2A, in that FIG. 3A depicts an example network 300. Network 300 includes BIER-enabled nodes 306, 308, 310, 314, 316 and 318. These BIER-enabled nodes form a provider network, or domain. Such a provider network may, for example, be employed by an Internet service provider to transport packets to customers. The domain includes core nodes 308 and 310, and provider edge nodes 306, 314, 316, and 318.

Advertised information 320 illustrates information advertised by ingress node 306 in the embodiment of FIG. 3A. In an embodiment, such information may be advertised using a type-length-value (TPV) format in an IGP. Similar information advertised by the other nodes of network 300 is also shown in FIG. 3A. For example, each BIER-enabled node is assigned and advertises the router ID (RID) shown. In addition, each node advertises the maximum BIER bit array length that it is capable of forwarding. In the embodiment of FIG. 3A, nodes 306, 308 and 316 have a maximum bit array length of 512 bits, while nodes 310, 314, and 318 have a maximum bit array length of 256 bits. When nodes within a network have differing maximum bit array capabilities, one or more network-wide bit array lengths are signaled, negotiated or configured. In an embodiment, such a negotiation is done through IGP advertisements. In a further embodiment, each node is configured to set as a maximum bit array length for use in the network the lowest maximum bit array length value received in an advertisement from any network node. In some embodiments, bit array lengths smaller than the maximum bit array length are used. In a network having a small number of multicast receivers, for example, a relatively short bit array may be sufficient for multicast routing while requiring less bandwidth for packet transmission since fewer bits are needed in a BIER packet header.

In the case of ingress router 306 and egress routers 314, 316, and 318, the set identifier and bit position (Set:BP) shown are also assigned and advertised. BIER-enabled node 316 is shown as being assigned a BP in set 1, while BIER-enabled nodes 306, 314, and 318 are in set 0. Advertised information in network 300 also includes a virtual bit position (VBP) for each edge router. For nodes having a set ID of 0, the bit position and virtual bit position are the same. For node 316 assigned to set 1, the bit position is 1 while the virtual bit position is 257. This is consistent with use of a network-wide bit array length of 256, such that node 316 cannot be represented in the bit array for set 0 and becomes the first node represented by the bit array for set 1. In the embodiment of FIG. 3A, BIER-enabled ingress node 306 has a group membership table 322 similar to GMT 224 of FIG. 2A. GMT 322 for includes set identifiers, and has a separate packet bit array entry for each set identifier associated with a node that is a member of multicast group G1.

In the embodiment of FIG. 3A, egress nodes 314, 316 and 318 are members of multicast group G1. Nodes 314 and 318 are represented in the entry corresponding to set 0, while node 316 is represented in the entry corresponding to set 1. In the packet bit array (PBA) entries of GMT 322, the 4 least significant bits of the PBA are included explicitly, while the other (unset) bits of the 256-bit PBA are represented as "0 . . . 0". As described above for ingress node 206 in FIG. 2A, ingress node 306 accesses GMT 322 to obtain a packet bit array for an incoming multicast packet. Because only one PBA is included with a BIER packet, separate copies of the packet are encapsulated for each set included in GMT 322 for the group corresponding to an incoming packet. For example, when node 306 receives an incoming multicast packet addressed to multicast group G1, it encapsulates one copy of the packet with the PBA and set ID for set 0, and forwards it for sending to nodes 314 and 318. Node 306 also encapsulates another copy of the packet with the PBA and set ID for set 1, and forwards it for sending to node 316.

An exemplary advertisement format for BIER information such as advertised information 320 is shown in FIG. 3B. In the embodiment of FIG. 3B, a 32-bit TLV (or sub-TLV) is used. In some embodiments, this type of sub-TLV is used in extensions to IGPs such as OSPF or IS-IS. BIER sub-TLV 330 includes type field 332 and length field 334. These fields are related to the TLV format of the particular protocol being used, and are not specific to BIER. Bit array length field 336 contains a bit array length that the advertising node is capable of forwarding. In an embodiment, one or more bit array lengths that a node can support are advertised without explicit identification of a maximum bit array length supported. Alternatively, a maximum bit array length may be advertised along with supported bit array lengths.

Topology identifier (Top. ID) field 338 of sub-TLV 330 identifies a topology that the advertising node is associated with. A topology as used herein is a subset of routers and links in a network for which a separate set of routes is calculated. In one embodiment, a topology is an Internet Protocol (IP) topology, and the topology identifier is expressed as an IP Multi-Topology identifier (MT-ID). In such an embodiment, a topology may also be referred to as an "underlay" herein. In an embodiment, the subset of routers and links comprising a topology is distinct from the "subnetworks" inherent to standard IP addressing. Topologies may overlap one another, such that a node is a member of multiple topologies, and a topology may include either fewer than or more than all of the routers and links within an IP subnet.

In another embodiment, a topology identified in Top. ID field 338 is a BIER sub-domain, a defined subset of BIER-enabled routers within a BIER domain. In such an embodiment, virtual bit positions and set identifiers may be assigned with respect to a sub-domain rather than the entire BIER domain. A router belonging to more than one sub-domain may in some embodiments be assigned different virtual bit positions (or BFR-IDs) for the respective different sub-domains. A router may be assigned the same virtual bit position in each BIER sub-domain that it belongs to, however, as long as the virtual bit position of the router is unique within each sub-domain and within the entire BIER domain. In an embodiment, each BIER sub-domain is associated with a single IP topology or routing underlay. In such an embodiment, a BIER-enabled router contains a mapping between any BIER sub-domain the router belongs to and the corresponding routing underlay for that sub-domain. In a further embodiment, advertisements by a BIER-enabled node include both BIER sub-domains and IP topologies that the node belongs to. In a still further embodiment, advertisement of IP topologies uses a different sub-TLV than sub-TLV 330.

Designation of different topologies within a network can be done for various purposes and may be useful, for example, in customizing network characteristics for different types of traffic (such as voice, video, and data). An advertising router may be a member of one or more topologies defined within a multi-topology network. Virtual bit position (VBP) field 340 contains the virtual bit position, or BFR-ID, of the advertising router. In an embodiment, a set ID and bit position are not included in BIER sub-TLV 330 because they can be determined using the VBP and the bit array length. An advertising node may support multiple bit array lengths, and may be included in multiple topologies. A node may therefore send an advertisement including multiple sub-TLVs 330 identifying different combinations of bit array length and topology. In the example of FIG. 3B, the Type, Length, and VBP fields are 16-bit fields, while the Bit Array Length and Topology ID are 8-bit fields. In other embodiments, different field sizes could be used as appropriate, and in still further embodiments the fields shown in FIG. 3B could be ordered differently.

Using the example BIER network of FIG. 3A, FIGS. 4A and 4B show exemplary bit indexed routing tables (BIRTs) constructed by BIER-enabled nodes 306 and 308, respectively. As shown in FIG. 4A, BIER-enabled node 306, with a router ID of "A", constructs a bit-indexed routing table 400. Bit-indexed routing table 400 includes a column 402 for router IDs received in advertisements from other network nodes. The router ID, in one embodiment, is a prefix assigned to each node. In the embodiment of FIG. 4A, BIRT 400 also includes a column 404 for a virtual bit position (VBP) assigned to each of the edge routers in the network. In an embodiment, interior nodes that are neither ingress nor egress nodes, such as the nodes with router IDs B and C, are not assigned bit positions. Nodes B and C therefore have null entries in column 404. Column 406 contains a maximum bit array length that each of the nodes is capable of forwarding.

Column 408 includes information identifying the set and bit position associated with the BIER-enabled egress nodes identified in the router ID column. In the embodiment of FIG. 4A, BIRT 400 includes set IDs and bit positions for two bit array lengths (BAL): 128 bits and 256 bits. In an embodiment, set IDs and bit positions are included for each bit array length advertised by a node in the network. The set IDs and bit positions are advertised by the nodes in some embodiments. In alternative embodiments, the set IDs and bit positions are calculated when forming routing table 400, from VPBs and bit array lengths received in advertisements. For edge routers such as D and F having small VBPs, the set ID and bit position are the same for the two bit array lengths included in table 400. Router E having a VBP of 257, however, is designated with the first bit position of set 1 for a bit array length of 256, or with the first bit position of set 2 for a bit array length of 128.

Bit-indexed routing table 400 also includes, at 410, a column for the neighbor used for routing to each node in the table. The neighbor column identifies the BIER-enabled router that is next on a path between node 306 and the node identified in the RID column of the bit-indexed routing table. For example, as shown in FIG. 3, the next hop BIER-enabled node between BIER-enabled node 306 (A/32) and BIER-enabled node 314 (D/32), is BIER-enabled node 308 (B/32). Bit-indexed routing table 400 may also include other information not shown in FIG. 4A, such as egress interface information and other information that might also appear in a traditional routing table.

FIG. 4B shows a bit-indexed routing table for BIER-enabled node 308, with router ID "B". Bit-indexed routing table 420 is similar to BIRT 400, and accordingly includes router ID column 402, VBP column 404, maximum bit array length column 406, set ID and bit position column 408 and neighbor column 410 as described for table 400 above. The values within these columns are different from those in the corresponding columns of table 400, since table 420 is for use by node 308 (B/32) rather than node 306 (A/32). Table 420 accordingly includes router A/32 instead of B/32, and identifies different neighbors for access to each router in the network.

Each BIER-enabled node translates its BIRT(s) into one or more bit-indexed forwarding tables (BIFTs). FIG. 5A shows an exemplary bit-indexed forwarding table 540. In the embodiment of FIG. 5, each node generates a separate forwarding table for each bit array length it is capable of forwarding. In this embodiment, BIFT 540 is created by BIER-enabled node 306 of FIG. 3 for forwarding packets having a bit array length of 256 bits. BIFT 540 includes column 542, which contains possible set identifiers of an incoming BIER packet. Table 540 also includes a bit position column 544. For each set, each bit position that has been assigned to an egress router reachable from the node using table 540 has an entry in the embodiment of FIG. 5A.

Column 546 includes information identifying a neighbor bit array (NBA) which can be compared to a packet bit array within a multicast data packet arriving at BIER-enabled node 306. In the same manner as described above with regard to the packet bit array field of group membership 322 in FIG. 3A, the 4 least significant bits of the NBA are included explicitly, while the other (unset) bits of the NBA are represented as "0 . . . 0". Because both router D (set 0, bit 1) and router F (set 0, bit 2) are reachable through neighbor router B, the NBA in the entry corresponding to each of these routers has both bits 1 and 2 set. To the extent that any reachable nodes indicated by the neighbor bit array are also intended destination nodes for the arriving multicast packet (indicated in this example by set bits in the packet bit array), a forwarded packet bit array representing the reachable intended destination nodes is sent with the forwarded multicast data packet toward those reachable intended nodes.

Neighbor column 548 of table 540 contains information identifying the neighbor along the shortest path towards the egress router corresponding to the BP identified in column 544. Bit-indexed forwarding table 540 may also include other information not shown in FIG. 5A, such as egress interface information and other information that might also appear in a traditional forwarding table. BIFT 550 of FIG. 5B is an exemplary table for forwarding by node 306 of BIER packets having a bit array length of 128 bits. In the embodiment of FIG. 5, table 550 differs from 540 only in the set identifier for the last entry.

Bit-indexed forwarding table 560 of FIG. 5C includes information used by BIER-enabled node 308 of FIG. 3 to forward BIER packets having a bit array length of 256 bits. Bit-indexed forwarding table 560 includes set column 542, bit position column 544, neighbor bit array column 546, and neighbor column 548, as described above for BIFT 540. The values within some of these columns are different from those of table 540, however, since table 560 is configured for forwarding from a different node. For example, since egress routers corresponding to bit position 1 (Set:BP of 0:1) and bit position 2 (Set:BP of 0:2) are shown in routing table 420 of FIG. 4B to be reachable via C, the corresponding BPs are aggregated to form neighbor bit array 0011 in forwarding table 560, which the BIER-enabled node puts in the BIFT entries corresponding to neighbor C. The aggregation involves, in one embodiment, performing a logical OR operation between bit arrays that each have a bit set only in the BP corresponding to the respective egress router reachable from the neighbor. The egress router corresponding to bit position 3 (SI:BP equal to 0:3) is shown in routing table 420 to be reachable via A. The corresponding bit is set in the neighbor bit array for neighbor A in BIFT 560. For set 1, the egress router corresponding to bit position 1 (SI:BP of 1:1) is shown in routing table 420 to be reachable via E. Bit 1 is therefore set in the NBA for neighbor E, in set 1, in BIFT 560.

Routing tables 400 and 420 and forwarding tables 540, 550, 560 and 570, along with any other tables described herein, are intended to illustrate the kinds of data being provided without limiting the format or arrangement of such data. Tables as described herein may have data arranged in multiple different ways, and may take the form of a database or some other data structure. Multiple tables for a single node, such as forwarding tables 540 and 550, may in an alternative embodiment take the form of portions of a single table. In an embodiment, forwarding and routing tables for a node may be combined into a single database or other data structure. Single tables described herein, such as routing tables 400 and 420, may in alternate embodiments be split into more than one data structure. "Table" as used herein may refer to a relevant portion of a table or other data structure, or to a collection of multiple tables or data structures holding related data.

Topologies in BIER

Figure 6:
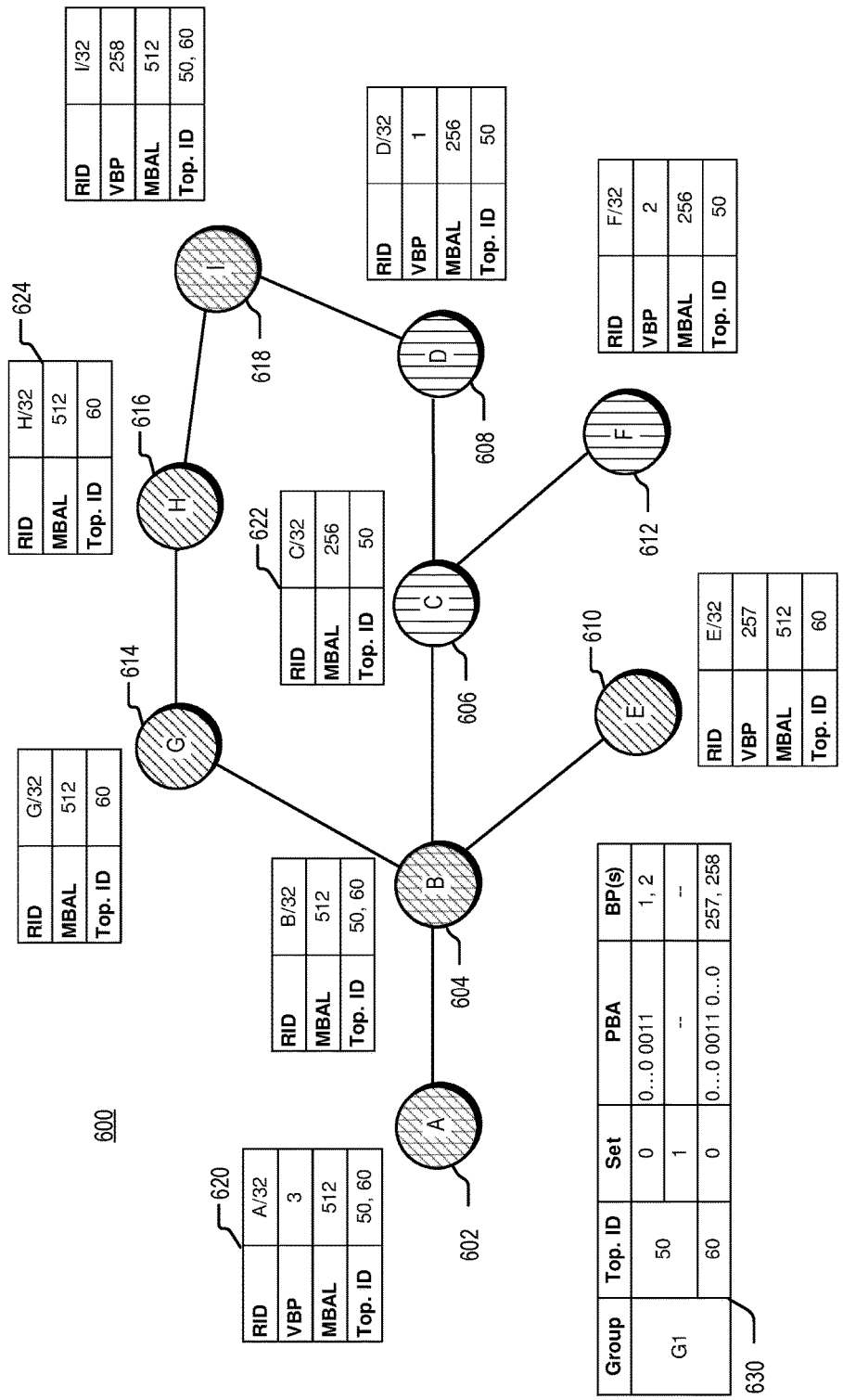
FIG. 6 is a simplified diagram illustrating certain components of an example network.

A simplified example of a multi-topology network is illustrated in FIG. 6. Network 600 of FIG. 6 includes nodes belonging to one or both of two topologies, identified by topology IDs 50 and 60. FIG. 6 includes advertised information associated with each node of network 600. For example, information 620 is advertised by node 602 (router A), information 622 is advertised by node 606 (router C), and information 624 is advertised by node 616 (router H). As can be seen from FIG. 6, each node in the network advertises its router ID (RID), the maximum bit array length (MBAL) it can forward, and any topology IDs it is associated with. As discussed in connection with FIG. 3B above, the topology identifier may include, for example, an IP MT-ID or a BIER sub-domain identifier. In addition, ingress router 602 and egress routers 608, 610, 612 and 618 advertise their respective virtual bit positions (VBPs). The information advertised by each node shows that some nodes, such as node 606 (router C), are included only in the topology corresponding to Top. ID 50 (also referred to as "topology 50" herein). Nodes in this topology are also indicated using a vertical hatching pattern in FIG. 6. Other nodes, such as node 610 (router E), are included only in the topology corresponding to Top. ID 60 (also referred to as "topology 60" herein). Nodes in this topology are indicated using a slanted hatching pattern in FIG. 6. Still other nodes, such as node 604 (router B), are included in both topologies.

In the embodiment of FIG. 6, nodes included only in topology 50 have a maximum bit array length of 256 bits, while nodes included only in topology 60 have a maximum bit array of 512 bits. In alternative embodiments, however, there is no relationship between the maximum bit array length for a node and a topology that the node belongs to. In some embodiments, nodes included in a single topology have multiple maximum bit array lengths. Moreover, the nodes belonging to multiple topologies of a network all have the same maximum bit array length in some embodiments.

In an embodiment, a packet assigned to a particular topology is routed only among nodes belonging to that topology. This is because the forwarding and routing information used to forward the packet is derived from nodes belonging to the same topology. In effect, network 600 includes two separate, but overlapping, networks: the network of topology 50 including routers A, B, C, D, F and I; and the network of topology 60 including routers A, B, E, G, H and I. In the embodiment of FIG. 6, edge nodes belonging to both topologies 50 and 60 are assigned the same virtual bit position in each topology. In an alternative embodiment, an edge node belonging to multiple topologies could have different VBP assignments corresponding to different topologies.

In the embodiment of FIG. 6, the two topologies in the network are reflected in group membership table 630 associated with BIER-enabled ingress node 602. In addition to sending a separate BIER-encapsulated packet for each set of destination nodes within a multicast group, ingress node 602 also sends a separate copy of the packet for each topology including destination nodes within the group. In the case of an egress router like node 618 (router I) that is included in both topologies, this could result in duplicate packets. In the embodiment of FIG. 6, GMT 630 has been built to include only one entry for each edge router. In this case, router I is included in the packet bit array for topology 60 and not in the PBA for topology 50. In one embodiment, the decision as to which of multiple possible topologies to use for a router in the GMT may be made based on an algorithm for minimizing the number of packets sent. Because router I would be in set 1 of topology 50, and router E can only be accessed through topology 60, inclusion of router I in topology 50 would result in 3 packets sent: one for each of the two sets in topology 50, and one for topology 60. Other decision criteria may be used in other embodiments.

Exemplary routing tables for certain nodes of network 600 are shown in FIGS. 7A and 7B. Table 700 of FIG. 7A is an example of a bit-indexed routing table for node 604 (router B) of network 600. Because node 604 is a member of both topologies 50 and 60, network nodes belonging to either of these topologies are included in BIRT 700. In an alternative embodiment, two separate routing tables are generated by node 604, one for topology 50 and another for topology 60. Columns 702, 704 and 706 of table 700 include router ID, virtual bit position (for edge nodes), and maximum bit array length handled, respectively. These columns are similar to columns 402, 404 and 406 of BIRT 400 discussed above in connection with FIG. 4A. Column 708 of table 700 contains topology ID values for any topologies that each node contained in the table belongs to. In an embodiment, a base or default topology is established to include all routers in the network. In a further embodiment, a packet having no topology ID (or an ID of zero) is designated as part of the base topology, and routed using global routing and forwarding tables for the base topology.

Column 710 of table 700 contains set identifiers and bit positions for the edge routers among the nodes identified in router ID column 702. In the embodiment of FIG. 7A, set IDs and bit positions are included for two bit array lengths (BALs): 256 bits and 512 bits. This embodiment is consistent with use of the maximum bit array length (256) that can be handled by all nodes in topology 50 for routing through that topology, and use of the maximum bit array length (512) that can be handled by all nodes in topology 60 for routing through that topology. Smaller bit array lengths that the nodes of either topology may be capable of routing are omitted from table 700 for simplicity in the embodiment of FIG. 7A. In alternate embodiments, however, smaller bit array lengths are advertised by network nodes, and these additional bit array lengths are also included in routing table 700. In other alternative embodiments, node 604 generates a separate routing table for each bit array length advertised by one of the routers identified in router ID column 702.

Table 700 also includes, in column 712, the neighbor node to be used by router B to connect to each router in the table. The neighbor nodes are provided for each topology; in the case of router I, for example, the neighbor used is different for a packet designated for topology 50 than for a packet routed through topology 60. Some routers are not reachable at all for a packet routed over a specific topology; accordingly, no neighbor node is given in the table for certain router/topology combinations.

FIG. 7B shows a bit-indexed routing table 720 generated by node 606 (router C) of network 600. Because router C is included only in topology 50, only routers also in that topology are included in table 720. Router ID column 702, VBP column 704, MBAL column 706 and Top. ID column 708 contain the same information described above in connection with table 700 of FIG. 7A, except that values for fewer routers are included. In the embodiment of FIG. 7B, topology ID 60 is listed in column 708 along with topology ID 50 for those nodes advertising both values, although table 720 includes routing information only for topology 50. Set:BP column 722 of table 720 differs from column 710 of FIG. 7A only in that the sole bit array length represented in column 722 is 256 bits, because some nodes in topology 50 cannot support the 512-bit length. Similarly, neighbor column 724 of table 720 differs from column 712 of table 700 in that the only topology included is topology 50. Like other tables described herein, bit-indexed routing tables 700 and 720 may include other information not shown, such as egress interface information and other information that might also appear in a traditional routing table.

Each of the BIER-enabled nodes in network 600 uses information in its bit-indexed routing table(s) to generate one or more bit-indexed forwarding tables. An exemplary forwarding table 800 for node 604 (router B) is shown in FIG. 8A. In the embodiment of FIG. 8A, BIFT 800 is sorted into portions corresponding to each of topologies 50 and 60 contained in column 802. The table is further sorted into portions corresponding to each of bit array lengths 256 and 512 contained in column 804. Because in network 600 each of the two bit array lengths corresponds to one of the two topologies, the same table portions result, in this embodiment, from selecting by topology or by bit array length. Portion 814 of table 800, indicated by left-leaning hatch lines, corresponds to topology 50 and bit array length 256, while portion 816, indicated by right-leaning hatch lines, corresponds to topology 60 and bit array length 512. In an embodiment, each of these table portions may be considered a separate forwarding table selected based on the topology ID and/or bit array length of an incoming packet. In an alternate embodiment, node 604 generates a separate forwarding table for each topology, for each bit array length, or for each combination of the two. In further embodiments, a separate table portion or table may be generated for each set identifier.

Set ID column 806 and bit position column 808 of table 800 are similar to columns 542 and 544 of, for example, table 540 in FIG. 5A. Edge routers A and I appear in both portions of table 800 because they are included in both topology 50 and topology 60. Because of its low virtual bit position, router A is identified with the same set and bit position (0:3) in both table portions. By contrast, router I is identified with set 1, bit position 2 in topology 50, and set 0, bit position 258 in topology 60. Neighbor bit array column 810 of table 800 is similar to NBA column 546 in table 540. Bit positions of edge routers reachable using the same neighbor node are aggregated in forming the NBA, but only when the edge routers are assigned to the same set and are included in the same topology. This is the case for routers D and F reachable from router B through neighbor C, so that bit positions 1 and 2 are both included in the NBA for neighbor C within the set 0 part of portion 814 of table 800. Each of the other edge routers in table 800 is either the only one in its set or in its topology that is reachable from a given neighbor. The NBA for entries corresponding to these other routers therefore has only the bit position corresponding to the destination router set. For the last two entries in table 800, corresponding to bit positions 257 and 258 in a 512-bit neighbor bit array, the four least significant bits of the upper 256 bits of the array (i.e., bits 257-260) are included explicitly, while the unset bits above and below these four bits are each represented as "0 . . . 0".

Neighbor column 812 of table 800 is similar to column 548 of table 540 in FIG. 5A. In the case of egress router I, table 800 shows that the neighbor used by router B to forward a packet in topology 50 to router I is router C (which then sends the packet through router D to router I). However, the neighbor used to forward a packet in topology 60 to router I is router G, which then sends the packet through router H to router I.

In an embodiment, bit-indexed forwarding table 820 of FIG. 8B is generated by node 606 (router C) from information in bit-indexed routing table 720 of FIG. 7B, and therefore includes only routers associated with topology 50 and with bit array length 256. Topology ID column 802, bit array length column 804, set column 806 and bit position column 808 of table 820 are therefore identical to the upper portion of the corresponding columns of table 800. The contents of neighbor bit array column 810 and neighbor column 812 in table 820 differ from the contents of the corresponding columns in table 800 because the two tables are generated by different nodes. In the case of table 820, for example, each neighbor bit array has only one bit set, because only one edge router within a given set is reachable from each neighbor to router C. It is noted that networks 300 and 600 described herein have been simplified for clarity and are much smaller and less complex than many actual networks. Like other tables described herein, bit-indexed forwarding tables 800 and 820 may include other information not shown, such as egress interface information and other information that might also appear in a traditional forwarding table.

BIER Packet Encapsulation

As illustrated by the examples described above, multicast packet forwarding using BIER requires that certain information carried with a packet be compared to information stored in bit-indexed forwarding tables at network nodes. For example, a packet forwarded using BIFT 800 of FIG. 8A should carry information including a packet bit array, a topology identifier such as an MT-ID or BIER sub-domain ID, a size or length value for the packet bit array, and a set identifier associated with the packet bit array.

Existing packet encapsulations such as Internet Protocol version 6 (IPv6) or Multiprotocol Label Switching (MPLS) can be adapted or extended to carry BIER-related information, and already carry other non-BIER-specific information used in forwarding (such as MT-ID). For example, a packet bit array and set identifier are written to the destination address field of an IPv6 header in one embodiment. In another embodiment, a packet bit array, size value, and set identifier are written to one or more IPv6 extension headers. An IP packet with an MPLS encapsulation is forwarded using one or more 32-bit labels inserted between the IP header and data link layer header of the packet. In one embodiment, BIER-related information including the packet bit array and set identifier is included in a stack of MPLS labels. In an alternative embodiment, some information such as the set identifier and bit array size are included in an MPLS label stack, while the bit array itself is encoded outside of the MPLS label structure, between the MPLS label stack and the payload of the packet. In a still further embodiment, the bit array may be included in a BIER header appearing between the label stack and the payload, where the BIER header also includes additional information such as the bit array size.

Use of an existing encapsulation such as IPv6 or MPLS has some advantages. Certain helpful but non-BIER-specific fields may already be included in the existing encapsulation, for example. In addition, the network equipment infrastructure for existing encapsulations is already in place. However, there are also disadvantages to adapting existing encapsulations for BIER forwarding. One disadvantage is that adapting an existing encapsulation to a different forwarding method constitutes a redefinition of well-established forwarding behavior for that encapsulation. Such redefinition could cause confusion and unintended consequences in a complex network. Certain adaptations, such as use of the IPv6 destination address field for the packet bit array, limit the length of the bit array and therefore the ultimate size of a BIER-enabled network.

An efficient implementation of BIER for multicast without disruption of existing forwarding mechanisms can be achieved through use of a dedicated BIER encapsulation. In an embodiment, the BIER encapsulation comprises a dedicated BIER header.

One embodiment of a BIER header format is shown in FIG. 9A. In the embodiment of FIG. 9A, packet or message 900 includes BIER header 901 and payload 920. BIER header 901 includes TTL field 902, entropy field 904, QOS field 906, topology ID field 908, Source ID field 910, Context field 912, AFI field 914, Set ID field 916, and Bit Array field 918.

TTL field 902 is adapted to contain expiration information for the packet. The expiration information may be in terms of time, as in an Internet Protocol version 4 (IPv4) TTL field. Alternatively, the expiration information may be in terms of hops through the network, as in the IPv6 Hop Limit field, or it may be expressed in any other way that indicates whether a packet is to be considered expired. In an embodiment, TTL field 902 is an 8-bit field.

Entropy field 904 is adapted to contain information useful in applying load balancing of packets among ECMP paths, in a manner similar to that of an MPLS entropy label. In an embodiment, field 904 contains an MPLS entropy label. In some embodiments, a requirement of the load balancing procedure is to ensure that packets belonging to the same multicast flow are forwarded along the same ECMP path. In a further embodiment, entropy field 904 contains a value based on a multicast flow that the packet is associated with. A flow as used herein is generally a stream of one or more packets traveling between a particular source and a particular destination having a set of common properties. In the multicast context, a flow is a stream of packets from the same source traversing the same multicast tree, or a stream of packets belonging to the same multicast group. In some embodiments, a flow value carried in entropy field 904 results from input of certain fields associated with the packet and indicative of the packet's flow into a load balancing function. In an embodiment, entropy field 904 is an 8-bit field.

In an embodiment, a flow value carried in entropy field 904 is reflective of the multicast flow to which the packet belongs. In a further embodiment, selection of an ECMP path for the packet includes ensuring that packets having the same value in entropy field 904 are assigned to the same ECMP path. In an alternative embodiment, information carried in entropy field 904 is an input to an algorithm used during routing of the packet to determine the multicast flow associated with the packet and/or to select an ECMP path.

QOS field 906 is for Quality of Service (QOS) bits as used in the IPv4 packet header for classification of traffic into classes, some of which receive preferential handling over others. In an embodiment, bits in field 906 are also referred to as Differentiated Services (DiffServ) bits. QOS field 906 is an 8-bit field in one embodiment. Topology ID field 908 is adapted to contain a topology identifier for a topology that the packet is to be routed over, as described above in connection with FIG. 3B and FIG. 6. In an embodiment, topology ID field 908 is an 8-bit field. In an alternative embodiment, field 908 is a 16-bit field. Source ID field 910 is adapted to contain an identifier of the node sending the multicast packet. In an embodiment, field 910 contains a virtual bit position or BFR-ID assigned to the sending node. In one embodiment, source ID field 910 is a 16-bit field.

Context field 912 is for information that would be carried by an MPLS context label, such as VPN information. In an embodiment, context field 912 is a 20-bit field. AFI field 914 is adapted to contain an Address Family Identifier (AFI) of the payload packet. In an embodiment, the payload packet is already encapsulated when received at an ingress node of a BIER network. The nature of this encapsulation (such as IPv4, IPv6, Ethernet, etc.) is indicated by the AFI. In an embodiment, AFI values are defined by the Internet Assigned Numbers Authority (IANA) and available in a database of various IP parameter assignments accessible through www.iana.org. In one embodiment, AFI field 914 is an 8-bit field. Set ID field 916 and bit array field 918 are adapted to contain a set identifier and packet bit array for the packet. In an embodiment, the set ID and packet bit array are assigned by a BIER-enabled ingress router to encode destination nodes within the set that are members of the packet's multicast group. In an embodiment, set ID field 916 is a 16-bit field. Bit array field 918 is of variable length in one embodiment. In a further embodiment, field 918 includes a leading size value indicating the length of the bit array. In an alternate embodiment, bit array field 918 is a 256-bit field.

Payload 920 is the packet encapsulated by BIER header 901. The packet may include existing encapsulation, as noted above. As such, certain fields in BIER header 901, may also be present in an IP header or MPLS label within payload 920. In an embodiment, the fields within BIER header 901 are used only by the BIER forwarding code at a node, and have no effect on similar fields within payload 920. In a further embodiment, the BIER header is removed by a BIER-enabled egress router when payload 920 is forwarded outside of a BIER-enabled domain. Fields within the encapsulation of payload 920 are then used in the normal manner by the protocols corresponding to the encapsulation.

In addition to encapsulation within payload 920, and therefore "inside" of BIER header 901, there is in some embodiments additional encapsulation surrounding the BIER-encapsulated packet, or "outside" of the BIER header. In a further embodiment, such outer encapsulation requires an indicator, analogous to that in AFI field 914, identifying the packet as BIER-encapsulated. In such an embodiment, one or more indicators for BIER, such as an EtherType value, are designated by an authority such as IANA.

The arrangement of fields within header 901 of FIG. 9A is merely one example of a suitable BIER header arrangement. The fields may be arranged in a different order in some embodiments, and either more or fewer fields may be included. Moreover, different numbers of bits than those described above may be used for any or all of the fields in header 901, as appropriate. FIGS. 9B and 9C illustrate use of the BIER header to encapsulate a packet being sent to multicast group G1 of the network of FIG. 6. Fields within header 901 not directly related to this example have been moved into additional fields 922 for clarity. Packet 930 of FIG. 9B is encapsulated with the packet bit array corresponding to destination nodes within set 0 of topology 50 of network 600. In an embodiment, ingress node 602 of FIG. 6 determines that the multicast group associated with an incoming packet is group G1, and retrieves information from GMT 630 to populate fields of BIER header 901. Topology ID field 908 is accordingly encoded with 50, and the virtual bit position of ingress node 602 is written to Source ID field 910. A zero value is included in set ID field 916, and the corresponding packet bit array from GMT 630 is included in bit array field 918.

In the embodiment of FIG. 9B, a bit array size subfield 924 is included at the beginning of bit array field 918. The bit array length in header 901 is variable in some embodiments, such that a size indicator is also included. The size of the bit array may be a separate field of the BIER header in some embodiments. The bit array size is represented as a number of bits in the embodiment of FIG. 9B, without indicating the specific way the number is encoded. In one embodiment, the number of bits is encoded in a standard binary form, using a subfield having a suitable number of bits. In an alternative embodiment, the size could be encoded in a different manner. For example, the size could be encoded as an integer multiplier of some known number of bits, such as 64 bits. In such an embodiment, a size value of 0 could represent 64 bits, a size value of 1 could represent 128 bits, and so on. Packet 950 of FIG. 9C is similar to packet 930 of FIG. 9B except that packet 950 is encoded for destinations in multicast group G1 reached through topology 60 of FIG. 6. In the embodiment of FIG. 6, each packet addressed to multicast group G1 is encapsulated as two packets having the information encoded in packets 930 and 950.

An alternative to the BIER header embodiment of FIG. 9A is shown in FIG. 9D. The header configuration in FIG. 9D differs from that of FIG. 9A through the inclusion of Length field 926. Length field 926 contains the length of the packet bit array in bit array field 918. In one embodiment, length field 926 is an 8-bit field. In an alternate embodiment, field 926 is a 4-bit field. In other embodiments, any suitable number of bits may be used for field 926. Encoding of the bit array length in Length field 926 may be done in any suitable manner, as described above for subfield 924 in FIGS. 9B and 9C. In an embodiment, subfield 924 is not included within bit array field 918 in a BIER packet header including Length field 926.

It is noted that some BIER-related information may be encoded in ways other than illustrated by header 901 above. For example, set identifiers may in some embodiments be linked to other attributes such as bit array length or topology. FIG. 9E shows an exemplary mapping of topologies and bit array lengths for the network of FIG. 6 to ranges of set identifiers. The size of a set ID range depends on the expected total number of routers meeting particular topology or bit array length criteria. In the mapping of FIG. 9E, nodes belonging to topology 50 and using a bit array length of 256 bits are assigned to the range of set IDs from 0 to 4. Successively higher ranges are assigned to nodes using a bit array length of 512 bits within topology 50, using a bit array length of 256 within topology 60, and using a bit array length of 512 within topology 60. A mapping such as that of FIG. 9E could be used by, for example, a network controller such as a multicast data controller to assign sets and bit positions to edge nodes within a network based on advertised topology and bit array length information. Use of the set assignment scheme of FIG. 9E would result in a bit-indexed forwarding table for router B of network 600 having the form shown in FIG. 9F. In some embodiments, mapping of set identifiers to topology and/or bit array length can make it unnecessary to encode those fields into a packet's BIER header.

Figure 10:
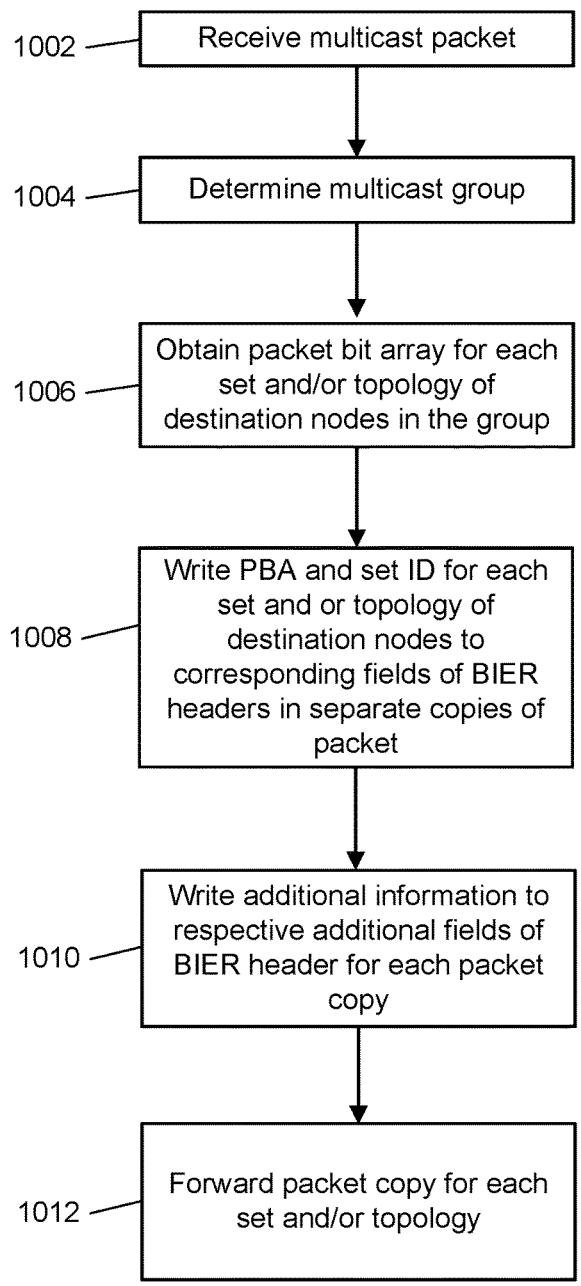
FIG. 10 is a flow chart illustrating an example process of encapsulating a packet for the network of FIG. 6.

FIG. 10 is a flowchart showing an example BIER encapsulation process performed by a BIER-enabled node in a BIER network. In one embodiment, the method is performed by an ingress router such as BIER-enabled node 602 of FIG. 6. While described as being performed by an ingress router, the method shown in FIG. 10 could be performed by a host, or other computing device, such as a network controller, either included in a BIER network or outside of a BIER network.

At 1002, the ingress router receives a multicast data packet that includes information (e.g., a multicast group address and/or source address) identifying a multicast group or flow. In one embodiment, the multicast data packet is received from a host, such as host 201 of FIG. 2A, configured to act as a source for the multicast group. The source can be directly coupled to the ingress router, or indirectly coupled through one or more intervening network elements, such as a CE node.

At 1004, the ingress router determines the multicast group that the multicast data packet belongs to. In one embodiment, this involves looking up the multicast group address in the multicast data packet. For example, in IPv6, the multicast group is traditionally encapsulated in the destination address (DA) field of the IPv6 header of a multicast data packet. The ingress router uses the multicast group information to determine which packet bit array should be added to the multicast data packet(s) that the ingress router forwards for this multicast group. In one embodiment, the ingress router forwards one multicast data packet for each set and each topology having at least one egress router that has signaled interest in the multicast group. At 1006, the ingress router obtains the packet bit array (PBA) corresponding to each set and/or topology of destination nodes (egress routers) in the packet's multicast group. In an embodiment, the packet bit array is obtained from a group membership table such as table 630 of FIG. 6. In a further embodiment, the packet bit arrays are obtained from a GMT that has been configured so that each edge router in the multicast group is represented in only one PBA within the table. In such an embodiment, the ingress router may simply obtain each PBA listed in the table for the packet's multicast group, along with the set and/or topology indicators corresponding to each PBA.

In step 1008 of FIG. 10, the packet bit array and corresponding set and/or topology identifiers for each set or topology is written the appropriate BIER header fields of a separate copy of the packet. For example, packet 930 of FIG. 9B has a packet bit array written into field 918, a topology identifier written into field 908, and a set identifier written into field 916. In an embodiment such as that of FIGS. 9E and 9F having topology identifiers mapped to set identifiers, a topology identifier may not need to be written to the BIER header of each packet. In step 1010, additional information is written to appropriate BIER header fields for each packet copy. Such additional information may include, for example, any of the fields shown in FIG. 9A for BIER header 901. In some cases the additional information is obtained from, for example, IP or MPLS encapsulation of the arriving multicast packet. Other information, such as bit array length, may be obtained from the group membership table or from advertisements received from network nodes. In step 1012, the separate packet copies for each set or topology are forwarded to the appropriate neighbor node in the BIER-enabled network. In one embodiment, steps 1006 through 1012 are performed in a loop, so that one packet copy (for one set or topology) is encapsulated and forwarded before the next copy is encapsulated. In other embodiments, all of the BIER encoding information is first retrieved and the packet copies are then encapsulated and forwarded.

Figure 11:
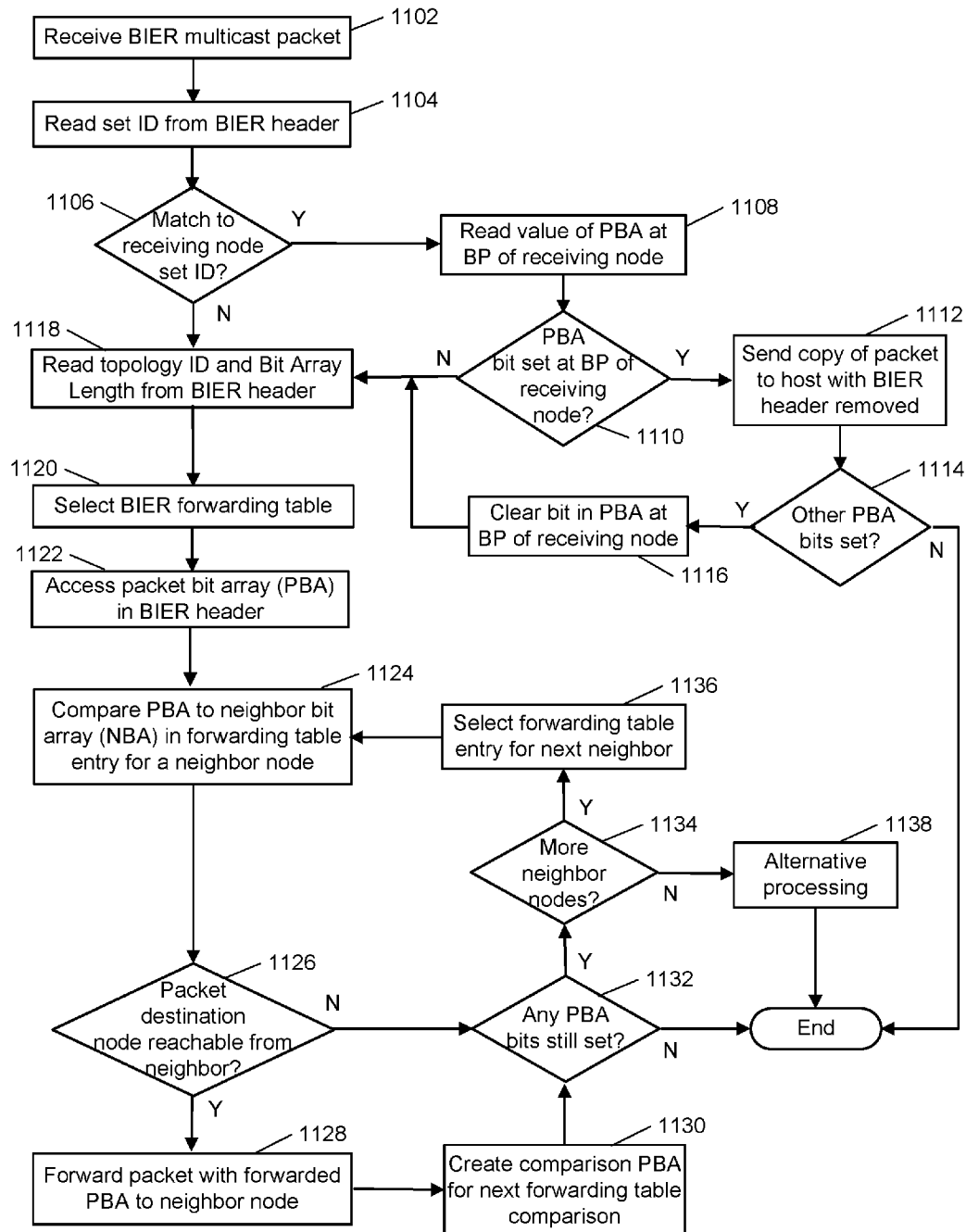
FIG. 11 is a flow chart illustrating an example process employed by a node of FIG. 6.

One embodiment of a process for forwarding of a BIER packet is shown in the flowchart of FIG. 11. In an embodiment, the method of FIG. 11 is performed by a network device associated with a BIER-enabled node. The method begins with receiving a BIER multicast packet at step 1102. In the embodiment of FIG. 11, the method first checks to determine whether the incoming packet has arrived at its destination node. This portion of the method (from steps 1104 through 1116) is appropriate for use at an egress node, but not at a core node that has not been assigned a set and bit position. A set identifier is read from a BIER header of the packet at step 1104. The set identifier is compared to a set ID of the receiving node at decision 1106. If the set identifiers of the packet and the receiving node match, the node (or associated network device) reads at step 1108 the bit from the packet bit array that corresponds to the bit position assigned to the receiving node. If the read bit of the packet bit array is set (decision 1110), the receiving node is a destination node for the packet. In that case (step 1112), a copy of the packet with the BIER header removed is sent to the host that signed up for the multicast group. The packet bit array is then checked for whether any other bits (corresponding to other destination nodes) are set (step 1114). If not, the forwarding process for this packet has ended. If additional bits are set, the packet is returned to the main forwarding process, after the PBA bit corresponding to the receiving node is cleared (step 1116).

The main forwarding process of the method of FIG. 11, entered after the destination node check process has ended or failed, begins at step 1118. In step 1118, topology ID and bit array length values are read from the BIER header of the packet. The set identifier was previously read from the header at step 1104. Based on one or more of the set ID, topology ID and bit array length values, a forwarding table for the BIER packet is selected at step 1120. In one embodiment, a combination of the topology ID and bit array length is used to select a forwarding table. In a further embodiment, the topology ID is a BIER sub-domain ID, and a combination of the sub-domain ID and bit array length is used to select a forwarding table. The forwarding table may be a separate table, similar to those in FIGS. 5A-5D, or a portion of a table, similar to portions 814 and 816 in FIG. 8A. In an embodiment such as that of FIGS. 9E and 9F, the set identifier alone may be sufficient for selection of a forwarding table. In some embodiments other parameters, such as the entropy field of the BIER header, may also be used in selection of a forwarding table. The packet bit array from the BIER header is accessed (step 1122) and compared to a neighbor bit array in a forwarding table entry for a neighbor node (step 1124). The packet bit array is compared to the neighbor bit array to determine whether any destination nodes for the packet are also reachable nodes from the neighbor associated with the forwarding table entry (decision step 1126). In an embodiment, if a bit is set in the same relative bit position in both the packet bit array and the neighbor bit array, the destination node is both a destination node for the packet and a reachable node from the neighbor.

In some embodiments, the comparison of the packet bit array and neighbor bit array to determine whether a destination node for the packet is a reachable node via the neighbor is done by considering one bit at a time of the packet bit array and neighbor bit array. In such an embodiment, the forwarding table may include an entry for each bit position corresponding to a reachable destination node, and the entries may be sorted by bit position, as shown in forwarding tables of FIG. 5A-5D or 8A-8B. The comparison in such an embodiment may include checking one bit at a time of the packet array until a bit position with a set bit is found, then looking in a bit position column of the forwarding table for an entry with a set bit in the same bit position.

Such a bit-by-bit approach may be faster in some embodiments than working through the forwarding table one neighbor at a time.

If no destination node of the packet is also a reachable node via a neighbor associated with a forwarding table entry (N branch of decision 1126), the method of FIG. 11 checks whether any bits in the packet bit array are still set (decision step 1132). If no bits are set, there are no multicast destinations remaining for the packet, and the method ends. If there are still one or more bits set in the packet bit array, the method checks whether any additional neighbor nodes are included in the forwarding table entries (decision step 1134). If there are no additional neighbor nodes represented in the table (that have not already been checked by comparison of the packet bit array and neighbor bit array), alternative processing at step 1138 may be attempted before ending the method. A situation in which set bits remain in the packet bit array but no neighbor nodes for forwarding remain in the forwarding table may represent, for example, a failure caused by a change in network configuration or a mislabeled packet. Another possibility is a change in topology assignment of a node; alternative processing could include attempting to route the packet through a base or default topology including additional nodes. If there is both a set bit remaining in the packet bit array and a neighbor node to be checked for reachable destinations, the method continues by selecting a forwarding table entry for the next neighbor node in the table (step 1136), and comparison of the packet bit array to the neighbor bit array for the new forwarding table entry (step 1124).

When comparison of the packet bit array and a neighbor bit array for a forwarding table entry reveals an intended destination node for the packet that is also reachable through the neighbor node associated with the forwarding table entry, a copy of the packet is forwarded to the neighbor node (step 1128). In the embodiment of FIG. 11, the packet bit array of the forwarded packet is altered to form a forwarded packet bit array. In the forwarded packet bit array, any set bits in the incoming packet bit array in bit positions not corresponding to reachable destinations via the neighbor node are cleared. In other words, for any destination nodes that were indicated in the incoming PBA as intended destinations but are not reachable via the neighbor node, the forwarded PBA is altered to indicate that those destinations are not intended destinations. In step 1130 of the method of FIG. 11, an alteration is also made to the version of the packet bit array used for comparison with the next forwarding table entry. To create a "comparison PBA" that is compared to the neighbor bit array in the next forwarding table entry, set bits in the current packet bit array in bit positions corresponding to those reachable by the just-forwarded packet are cleared in the comparison packet bit array. The comparison packet bit array is then used as the packet bit array in subsequent steps of the method. If there are still bits set in the comparison PBA (decision 1132), and if there are more neighbor nodes in the forwarding table (decision 1134), the method continues with the comparison packet bit array used for the next comparison to a neighbor bit array. The packet bit array alterations of steps 1128 and 1130 are optionally employed to prevent looping and duplication of packets. One or both of these alterations may be omitted in embodiments for which duplication and looping are not present or are otherwise not of concern.

Figure 12A:
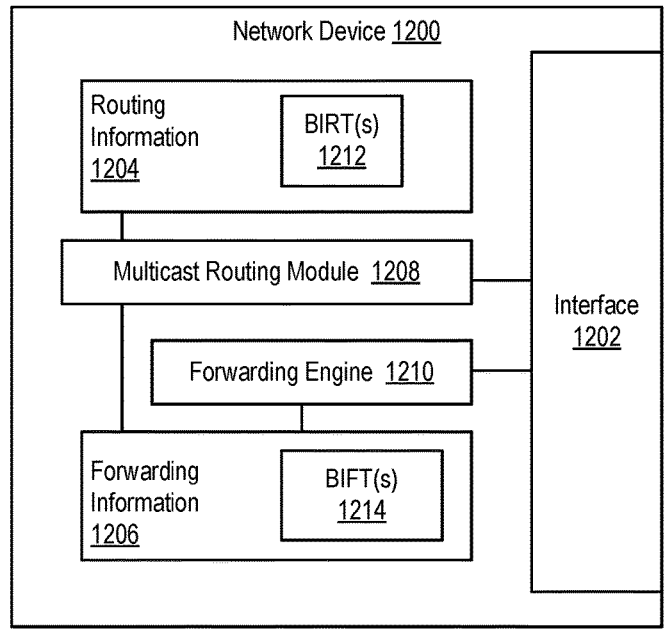
FIGS. 12A and 12B are block diagrams illustrating certain components of an example network device that can be employed in the networks described herein.

FIG. 12A is a block diagram of an exemplary network device that may be associated with a node in one of the networks described herein. Network device 1200 may, for example, be associated with a core router or egress router in network 300 of FIG. 3 or network 600 of FIG. 6. In the embodiment of FIG. 12A, network device 1200 includes storage for multicast routing information 1204, storage for multicast forwarding information 1206, a routing module 1208, and an interface 1202. Interface 1202 is coupled to send and receive packets. It is noted that network device 1200 may include additional interfaces, and that each interface can be a logical or physical interface.

Routing module 1208 is configured to perform multicast routing based on the stored multicast routing information 1204. Routing information 1204 includes bit-indexed routing tables 1212. In an embodiment, routing tables 1212 are similar to routing tables described above in connection with FIGS. 4A, 4B, 7A and 7B. In the case of an edge router, routing information 1204 may also include a set identifier and bit position assigned to the node associated with network device 1200. Routing module 1208 is also configured to update the stored multicast forwarding information 1206. Forwarding information 1206 includes one or more bit-indexed forwarding tables 1214. In an embodiment, forwarding tables 1214 are similar to forwarding tables described above in connection with FIGS. 5A-5D and 8A-8B. A forwarding engine 1210 can forward multicast data packets using the stored multicast forwarding information 1206.

Figure 12B:
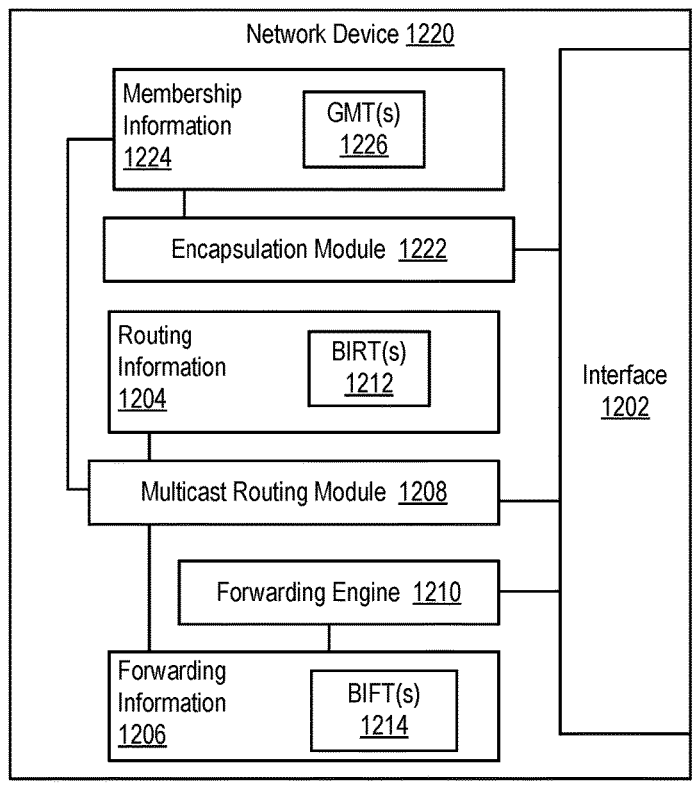

A block diagram of an additional network device is shown in FIG. 12B. In an embodiment, network device 1220 of FIG. 12B is associated with an ingress node of a BIER-enabled network. In addition to an interface, routing module, forwarding engine, routing information and forwarding information similar to those described above for network device 1200, network device 1220 includes membership information 1224 and an encapsulation module 1222. Membership information 1224 includes one or more multicast group membership tables (GMTs) 1226. In an embodiment, GMTs 1226 are similar to GMTs 224, 322, and 630 described in FIGS. 2B, 3A and 6 above. In the embodiment of FIG. 12B, multicast routing module 1208 is configured to update membership information 1224. Encapsulation module 1222 is configured to access membership information 1224 in order to perform encapsulation of BIER packets through a method similar to that of FIG. 10 above.

Figure 13:
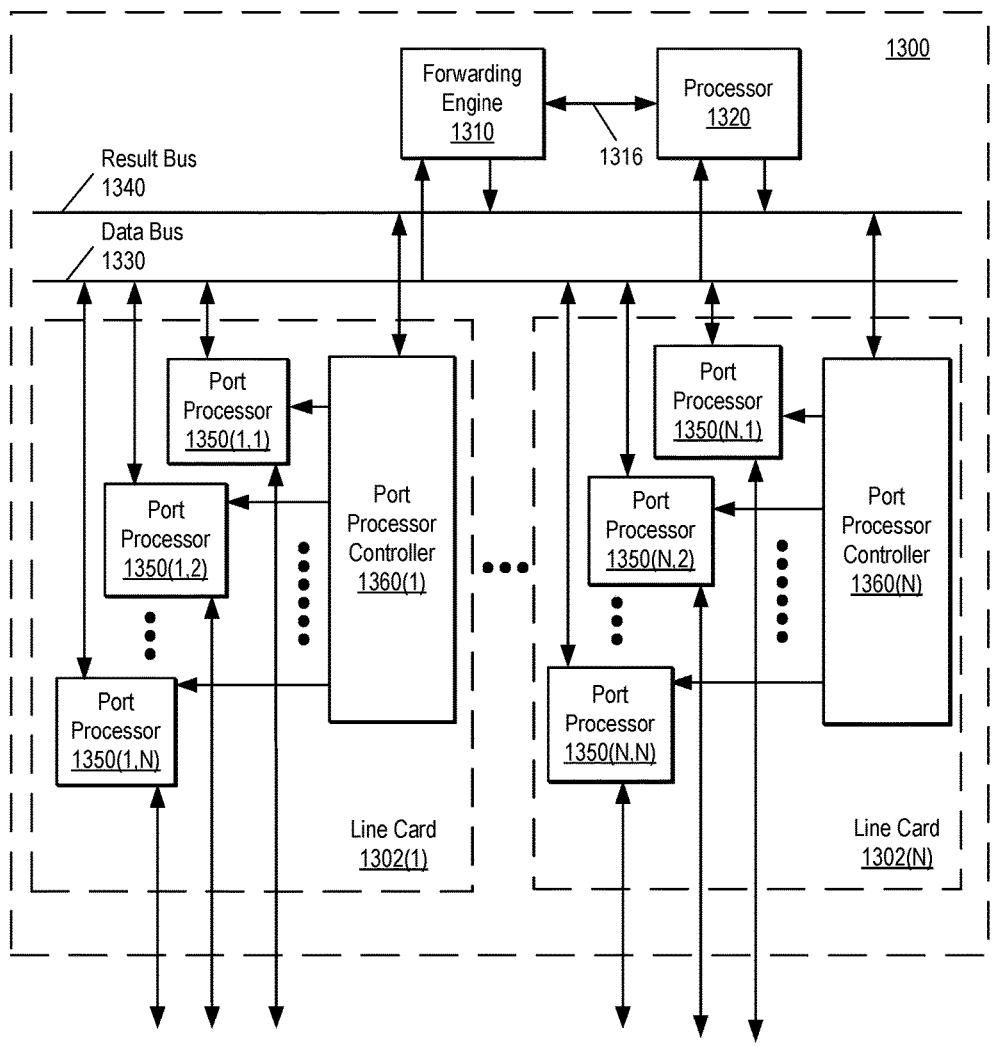
FIG. 13 is a block diagram illustrating certain components of an example network device that can be employed in the networks described herein.

FIG. 13 is a block diagram illustrating certain additional and/or alternative components of nodes that can be employed, for example in the networks shown in FIGS. 2, 3, and 6. In this depiction, node 1300 includes a number of line cards (line cards 1302(1)-(N)) that are communicatively coupled to a forwarding engine or packet forwarder 1310 and a processor 1320 via a data bus 1330 and a result bus 1340. Line cards 1302(1)-(N) include a number of port processors 1350(1, 1)-(N, N) which are controlled by port processor controllers 1360(1)-(N). It will also be noted that forwarding engine 1310 and processor 1320 are not only coupled to one another via data bus 1330 and result bus 1340, but are also communicatively coupled to one another by a communications link 1316.

The processors 1350 and 1360 of each line card 1302 may be mounted on a single printed circuit board. When a packet or packet and header are received, the packet or packet and header may be identified and analyzed by router 1300 in the following manner Upon receipt, a packet (or some or all of its control information) or packet and header is sent from the one of port processors 1350(1, 1)-(N, N) at which the packet or packet and header was received to one or more of those devices coupled to data bus 1330 (e.g., others of port processors 1350(1, 1)-(N, N), forwarding engine 1310 and/or processor 1320). Handling of the packet or packet and header can be determined, for example, by forwarding engine 1310. For example, forwarding engine 1310 may determine that the packet or packet and header should be forwarded to one or more of port processors 1350(1, 1)-(N, N). This can be accomplished by indicating to corresponding one(s) of port processor controllers 1360(1)-(N) that the copy of the packet or packet and header held in the given one(s) of port processors 1350(1,1)-(N,N) should be forwarded to the appropriate one of port processors 1350(1,1)-(N,N). In addition, or alternatively, once a packet or packet and header has been identified for processing, forwarding engine 1310, processor 1320 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 14:
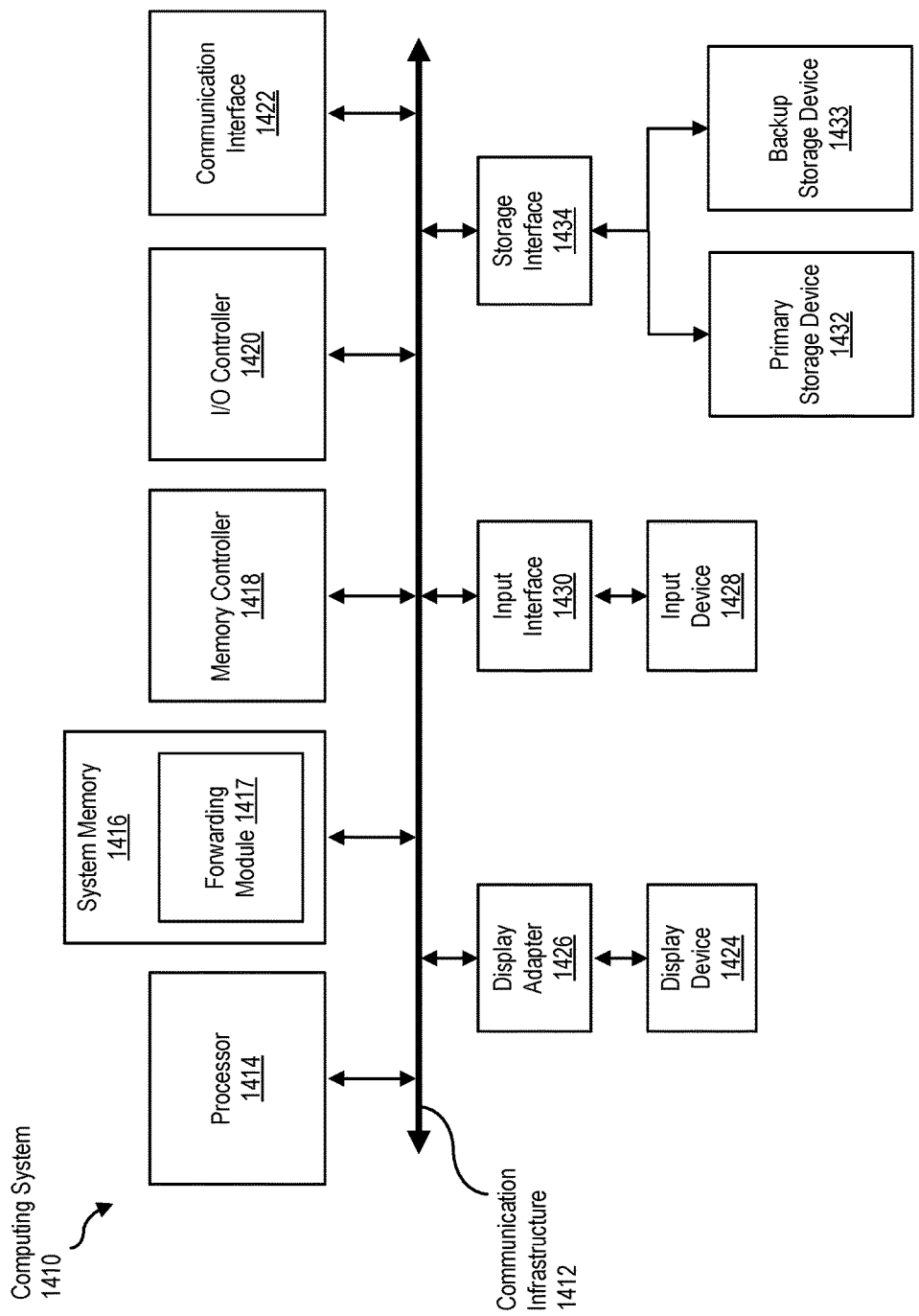
FIG. 14 is a block diagram depicting a computer system suitable for implementing embodiments of the devices and systems described herein.

FIG. 14 is a block diagram of a computing device, illustrating, for example, implementation of a forwarding module in software as described above. Computing system 1410 broadly represents any single or multi-processor computing device or system capable of executing computer-readable instructions. Examples of computing system 1410 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1410 may include at least one processor 1414 and a system memory 1416. By executing the software that implements a forwarding module 1417, computing system 1410 becomes a special purpose computing device that is configured to perform packet forwarding, in the manner described above.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the embodiments described and/or illustrated herein. For example, processor 1414 may perform and/or be a means for performing the operations described herein. Processor 1414 may also perform and/or be a means for performing any other operations, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, program instructions executable to implement a forwarding module configured to forward multicast data packets may be loaded into system memory 1416.

In certain embodiments, computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the operations or features described and/or illustrated herein.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer) for display on display device 1424.

As illustrated in FIG. 14, computing system 1410 may also include at least one input device 1428 coupled to communication infrastructure 1412 via an input interface 1430. Input device 1428 generally represents any type or form of input device capable of providing input, either computer or human generated, to computing system 1410. Examples of input device 1428 include, without limitation, a keyboard, a pointing device, a speech recognition device, or any other input device.

As illustrated in FIG. 14, computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410. A storage device like primary storage device 1432 can store information such as routing tables and forwarding tables.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14.

Computing system 1410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1410 for storage in memory via a network such as the Internet or upon a carrier medium.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1410 may be configured as an application specific integrated circuit (ASIC) adapted to implement one or more of the embodiments disclosed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method comprising:
   receiving at a node in a network a multicast message comprising a message header and a message payload, wherein
      the message header comprises an incoming message bit array and a set identifier value associated with the incoming message bit array,
      the set identifier value is one of a plurality of set identifier values used in the network,
      each of the plurality of set identifier values identifies a respective one of a plurality of sets of multiple possible destination nodes for the message, and
      each destination node within one of the sets of multiple possible destination nodes is represented by a relative bit position in the incoming message bit array;
   selecting a first forwarding table entry of one or more forwarding table entries in a bit-indexed forwarding table at the node, wherein the first forwarding table entry comprises a set identifier value matching the set identifier value in the message header;
   comparing at least a portion of the incoming message bit array to a corresponding portion of a first neighbor bit array of the first forwarding table entry;
   determining that for at least one relative bit position the corresponding destination node is both an intended destination for the message and a reachable destination from a first neighboring node associated with the first forwarding table entry; and
   forwarding to the first neighboring node a copy of the message comprising a forwarded message bit array in place of the incoming message bit array.

2. The method of claim 1, wherein the set identifier value in the message header is mapped to a topology identifier value for the message.

3. The method of claim 1, wherein the set identifier value in the message header is mapped to a length of the incoming message bit array.

4. The method of claim 1, wherein:
the message header further comprises a topology identifier value for the message, and
the first forwarding table entry comprises a topology identifier value matching the topology identifier value in the message header.

5. The method of claim 1, wherein the message header further comprises a source identifier value identifying a relative bit position assigned to a sending node for the message.

6. The method of claim 1, wherein the message header further comprises a message protocol identifier value identifying a protocol type associated with the message payload.

7. The method of claim 1, further comprising effectuating a modification to the forwarded message bit array.

8. The method of claim 7, wherein effectuating a modification comprises:
for any destination node that is indicated by the incoming message bit array as an intended destination but indicated by the first neighbor bit array as an unreachable destination, altering the bit value of the corresponding relative bit position in the forwarded message bit array from that of the incoming message bit array to indicate that the destination node is not an intended destination.

9. The method of claim 7, wherein effectuating a modification comprises advertising to the first neighboring node a set of bit values contained in the first neighbor bit array, wherein the first neighboring node is adapted to use the set of bit values to perform the modification to the forwarded message bit array.

10. A network device associated with a network node, the network device comprising:
one or more network interfaces;
a memory configured to store a bit-indexed forwarding table comprising one or more forwarding table entries; and
a processor configured to
receive at the network node a multicast message comprising a message header and a message payload, wherein
the message header comprises an incoming message bit array and a set identifier value associated with the incoming message bit array,
the set identifier value is one of a plurality of set identifier values used in the network,
each of the plurality of set identifier values identifies a respective one of a plurality of sets of multiple possible destination nodes for the message, and
each destination node within one of the sets of multiple possible destination nodes is represented by a relative bit position in the incoming message bit array,
select a first forwarding table entry of the one or more forwarding table entries, wherein the first forwarding table entry comprises a set identifier value matching the set identifier value in the message header,
compare at least a portion of the incoming message bit array to a corresponding portion of a first neighbor bit array of the first forwarding table entry,
determine that for at least one relative bit position the corresponding destination node is both an intended destination for the message and a reachable destination from a first neighboring node associated with the first forwarding table entry, and
forward to the first neighboring node a copy of the message comprising a forwarded message bit array in place of the incoming message bit array.

11. The network device of claim 10, wherein the memory is further configured to store a bit-indexed routing table mapping the set identifier value in the message header to a topology identifier value for the message.

12. The network device of claim 10, wherein the memory is further configured to store a bit-indexed routing table mapping the set identifier value in the message header to a length of the incoming message bit array.

13. The network device of claim 10, wherein:
the message header further comprises a topology identifier value for the message; and
the first forwarding table entry comprises a topology identifier value matching the topology identifier value in the message header.

14. The network device of claim 10, wherein the processor is further configured to effectuate a modification to the forwarded message bit array.

15. The network device of claim 14, wherein the processor is further configured to, for any destination node that is indicated by the incoming message bit array as an intended destination but indicated by the first neighbor bit array as an unreachable destination, alter the bit value of the corresponding relative bit position in the forwarded message bit array from that of the incoming message bit array to indicate that the destination node is not an intended destination.

16. The network device of claim 14, wherein:
the processor is further configured to advertise to the first neighboring node a set of bit values contained in the first neighbor bit array, and
the first neighboring node is configured to use the set of bit values to perform the modification to the forwarded message bit array.

17. A network device associated with a network node, the network device comprising:
one or more network interfaces;
a memory configured to store a group membership table mapping a multicast group identifier to one or more message bit arrays, wherein the group membership table further maps a set identifier value to each of the one or more message bit arrays; and
a processor configured to
receive at the network node a multicast message,
determine a multicast group identifier associated with the multicast message,
obtain from the group membership table a first message bit array and first set identifier value corresponding to the multicast group identifier,
insert the first message bit array and first set identifier value into a header of a first copy of the multicast message,
obtain from the group membership table a second message bit array and second set identifier value corresponding to the multicast group identifier,
insert the second message bit array and second set identifier value into a header of a second copy of the multicast message, wherein
the first and second set identifier values are among a plurality of set identifier values used in the network, each of the plurality of set identifier values identifies a respective one of a plurality of sets of multiple possible destination nodes for the multicast message, each destination node within a set of multiple possible destination nodes identified by the first set identifier is represented by a relative bit position in the first message bit array, and each destination node within a set of multiple possible destination nodes identified by the second set identifier is represented by a relative bit position in the second message bit array, forward the first copy of the multicast message toward one or more of the destination nodes represented by relative bit positions in the first message bit array, and forward the second copy of the multicast message toward one or more of the destination nodes represented by relative bit positions in the second message bit array.

18. The network device of claim 17, wherein:

the memory is further configured to store a bit-indexed forwarding table comprising one or more forwarding table entries; and the processor is further configured to compare at least a portion of the first message bit array to a corresponding portion of a first neighbor bit array in a first forwarding table entry of the one or more forwarding table entries, determine that for at least one relative bit position the corresponding destination node is both an intended destination for the multicast message and a reachable destination from a first neighboring node associated with the first forwarding table entry, and forward to the first neighboring node a copy of the multicast message.

19. The network device of claim 17, wherein:

the group membership table further maps a topology identifier value to each of the one or more message bit arrays; and the processor is further configured to obtain from the group membership table a first topology identifier value corresponding to the multicast group identifier, and insert the first topology identifier value into the header of the first copy of the multicast message.

* * * * *